United States Patent [19]
Takayama et al.

[11] Patent Number: 5,027,215
[45] Date of Patent: Jun. 25, 1991

[54] DRIVING APPARATUS FOR SOLID STATE IMAGE SENSORS INCLUDING A SWEEPING ACTION CONTROLLER

[75] Inventors: Jun Takayama; Seiichi Isoguchi, both of Hachioji, Japan

[73] Assignee: Konica Corporation, Tokyo, Japan

[21] Appl. No.: 441,301

[22] Filed: Nov. 27, 1989

[30] Foreign Application Priority Data

| Nov. 29, 1988 | [JP] | Japan | 63-301790 |
| Nov. 29, 1988 | [JP] | Japan | 63-301791 |
| Nov. 29, 1988 | [JP] | Japan | 63-301792 |
| Nov. 30, 1988 | [JP] | Japan | 63-303458 |
| Dec. 1, 1988 | [JP] | Japan | 63-305058 |

[51] Int. Cl.[5] .................. H04N 3/14; H04N 5/335
[52] U.S. Cl. .................. 358/213.11; 358/213.15; 358/213.23; 358/213.27; 358/209
[58] Field of Search .................. 358/909, 906, 213.11, 358/213.23, 241, 44, 21 R, 213.15, 213.27, 342

[56] References Cited

U.S. PATENT DOCUMENTS

| 4,748,506 | 5/1988 | Hieda | 358/213.15 |
| 4,825,324 | 4/1989 | Miyake et al. | 358/906 |
| 4,881,127 | 11/1989 | Isoguchi et al. | 358/213.19 |
| 4,924,316 | 5/1990 | Kobayashi et al. | 358/213.26 |

*Primary Examiner*—John K. Peng
*Assistant Examiner*—Tuan V. Ho
*Attorney, Agent, or Firm*—Jordan B. Bierman

[57] ABSTRACT

A driving apparatus for solid state image sensors used for an electronic still camera for taking a still picture with a solid state image sensor, and adapted to generate timing pulses for carrying out an exposure operation of the solid state image sensor and reading electric charges occurring in a light receiving portion of the solid state image sensor due to the exposure of the film. A device generates timing pulses for carrying out the exposure and reading operations of the solid state image sensor. A sweeping action controller in the timing pulse generating device makes when a predetermined voltage is applied from the outside thereto a timing pulse for sweeping the electric charges, which are accumulated in the light receiving element in the solid state image sensor, to the outside. The predetermined voltage is applied to the sweeping action controller before the starting of the exposure operation to carry out an operation of sweeping out the electric charges in the solid state image sensor.

5 Claims, 16 Drawing Sheets

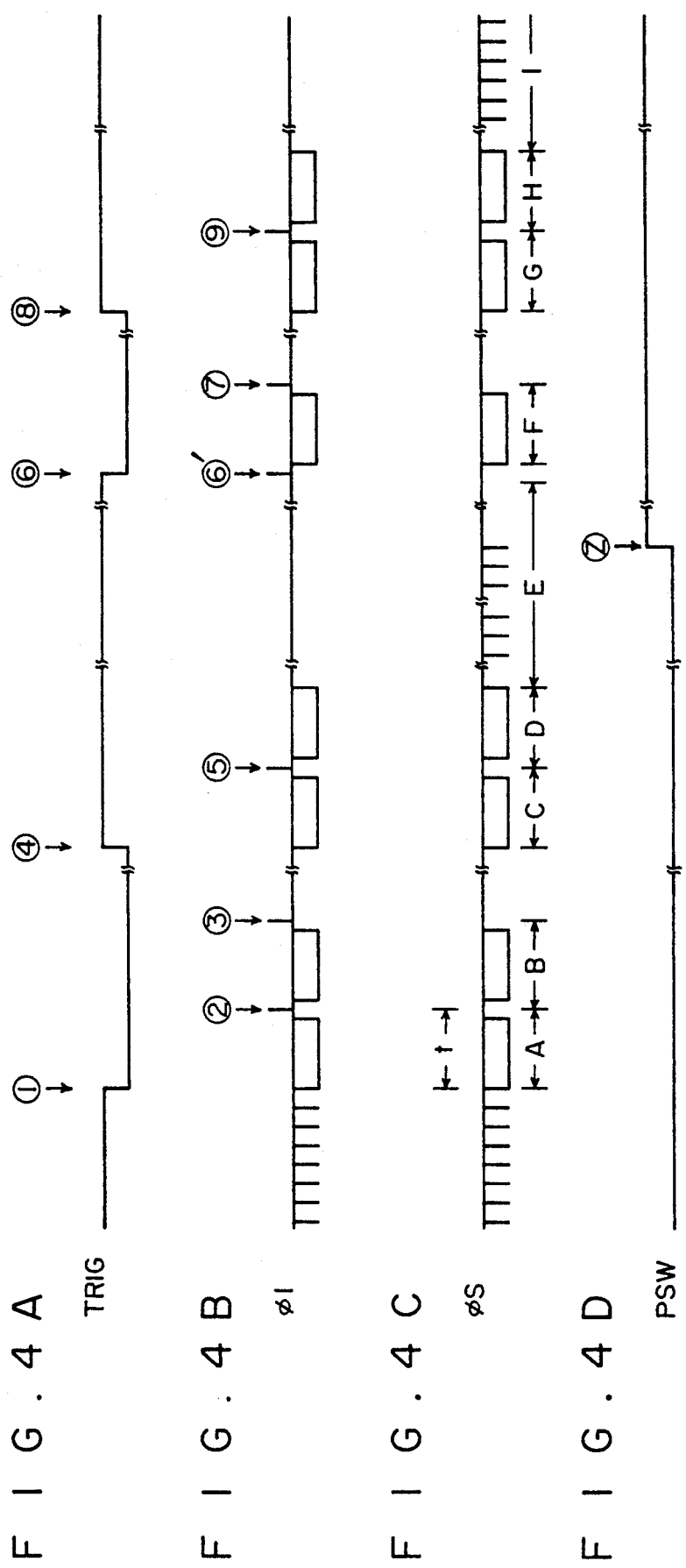

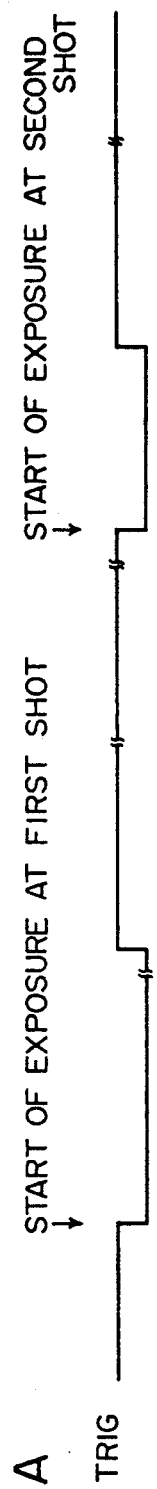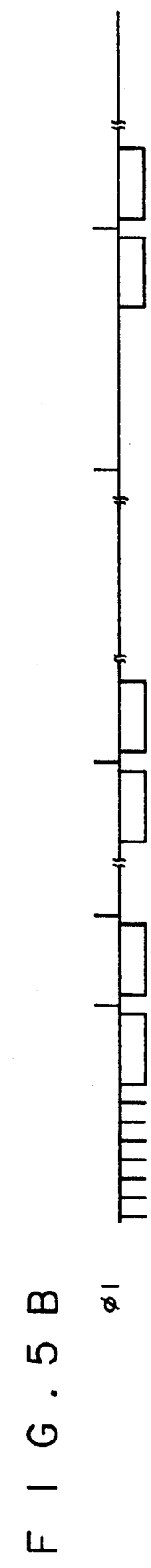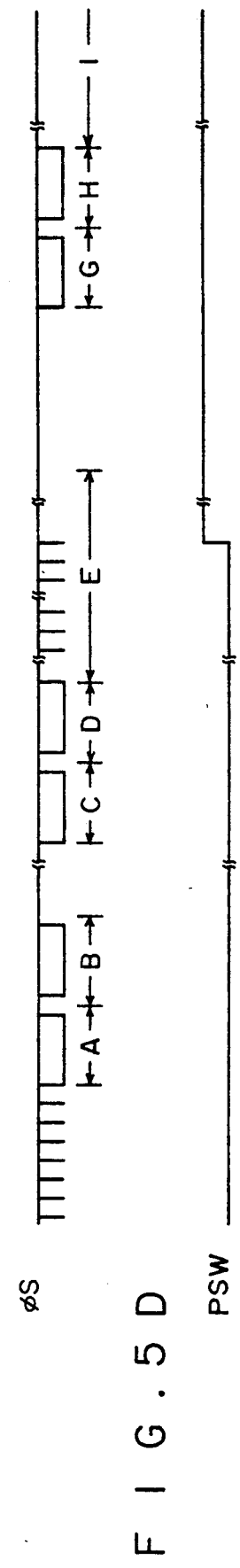
FIG. 5A TRIG
FIG. 5B φ1
FIG. 5C φS
FIG. 5D PSW

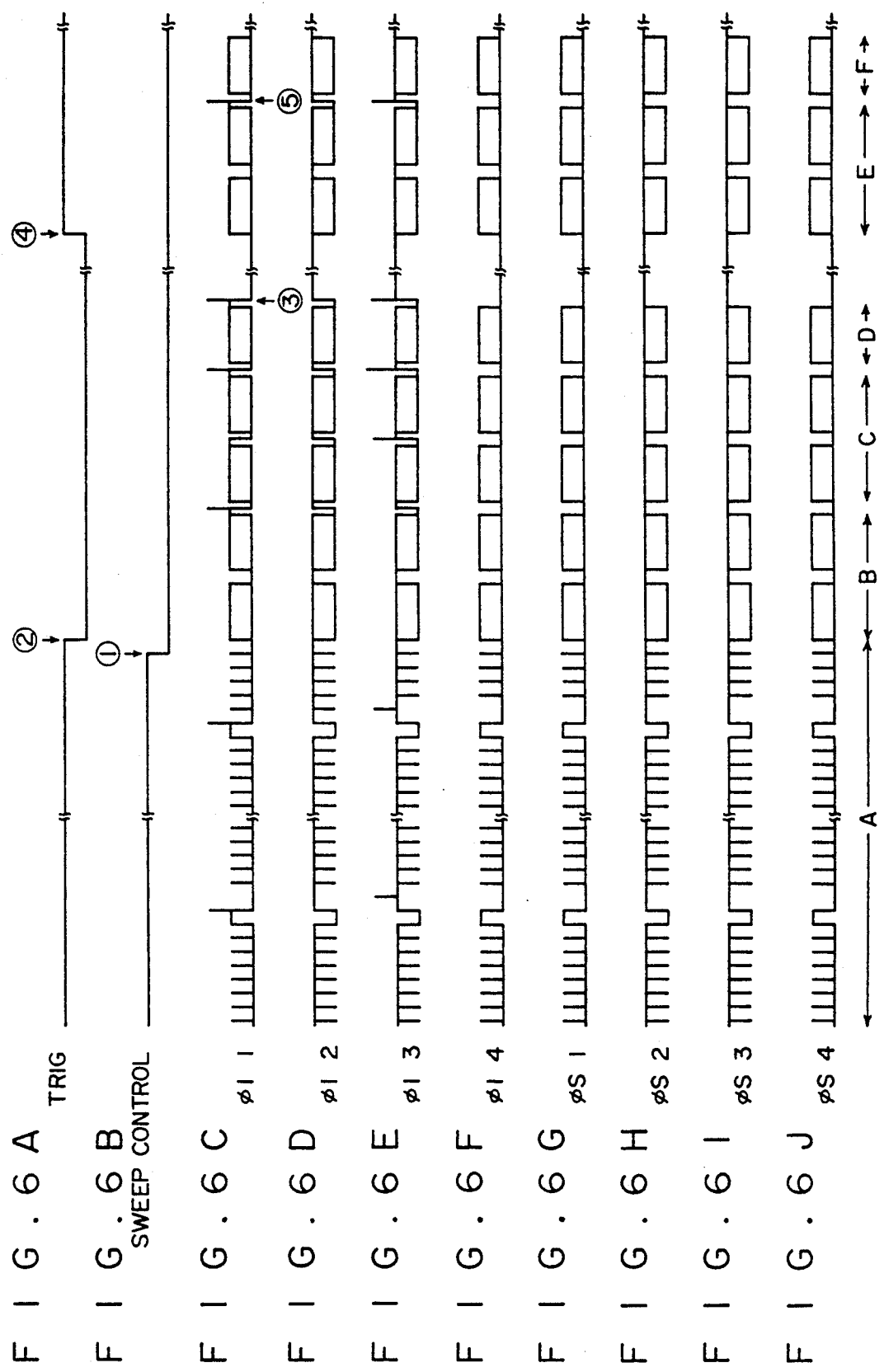

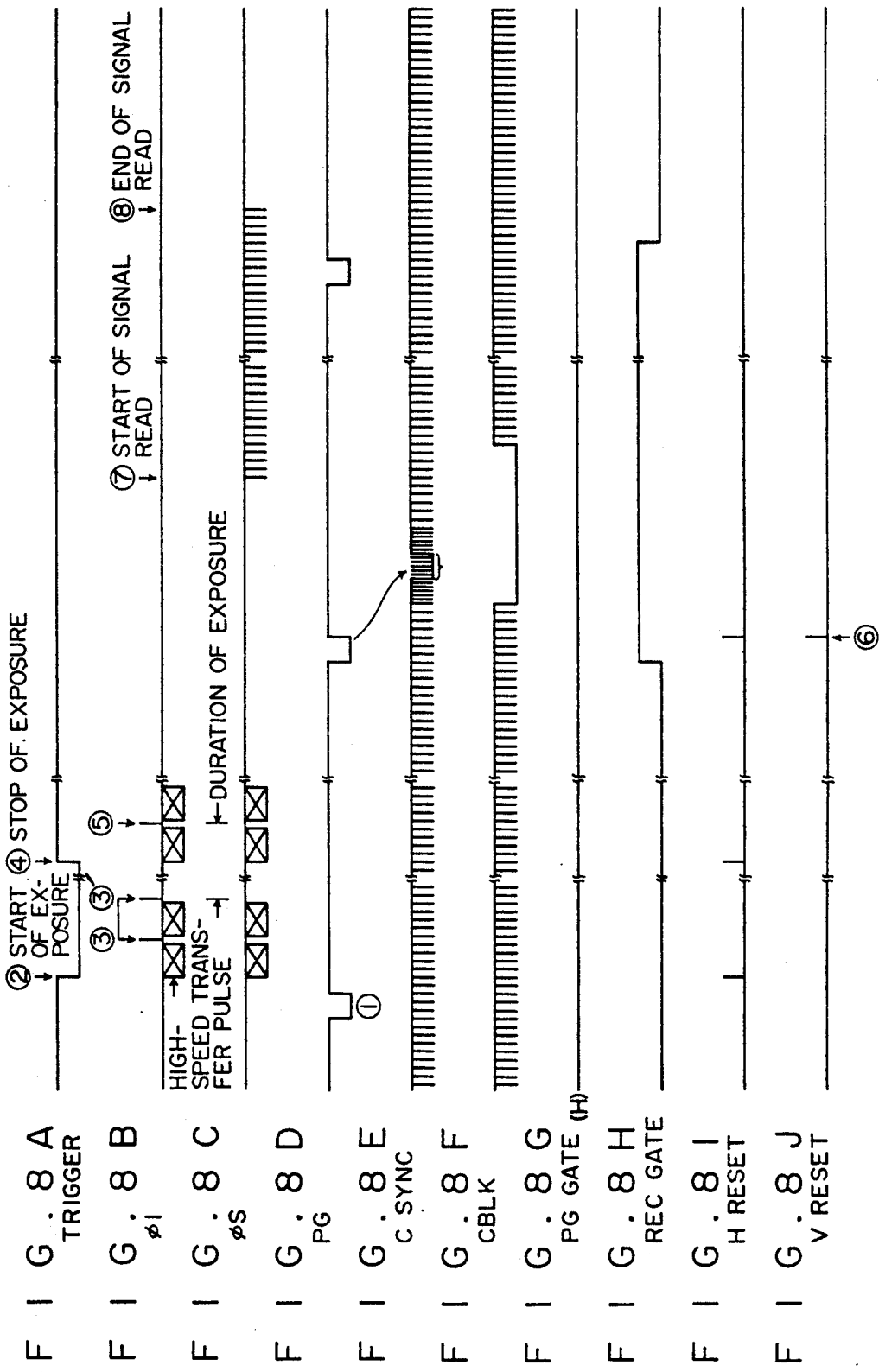

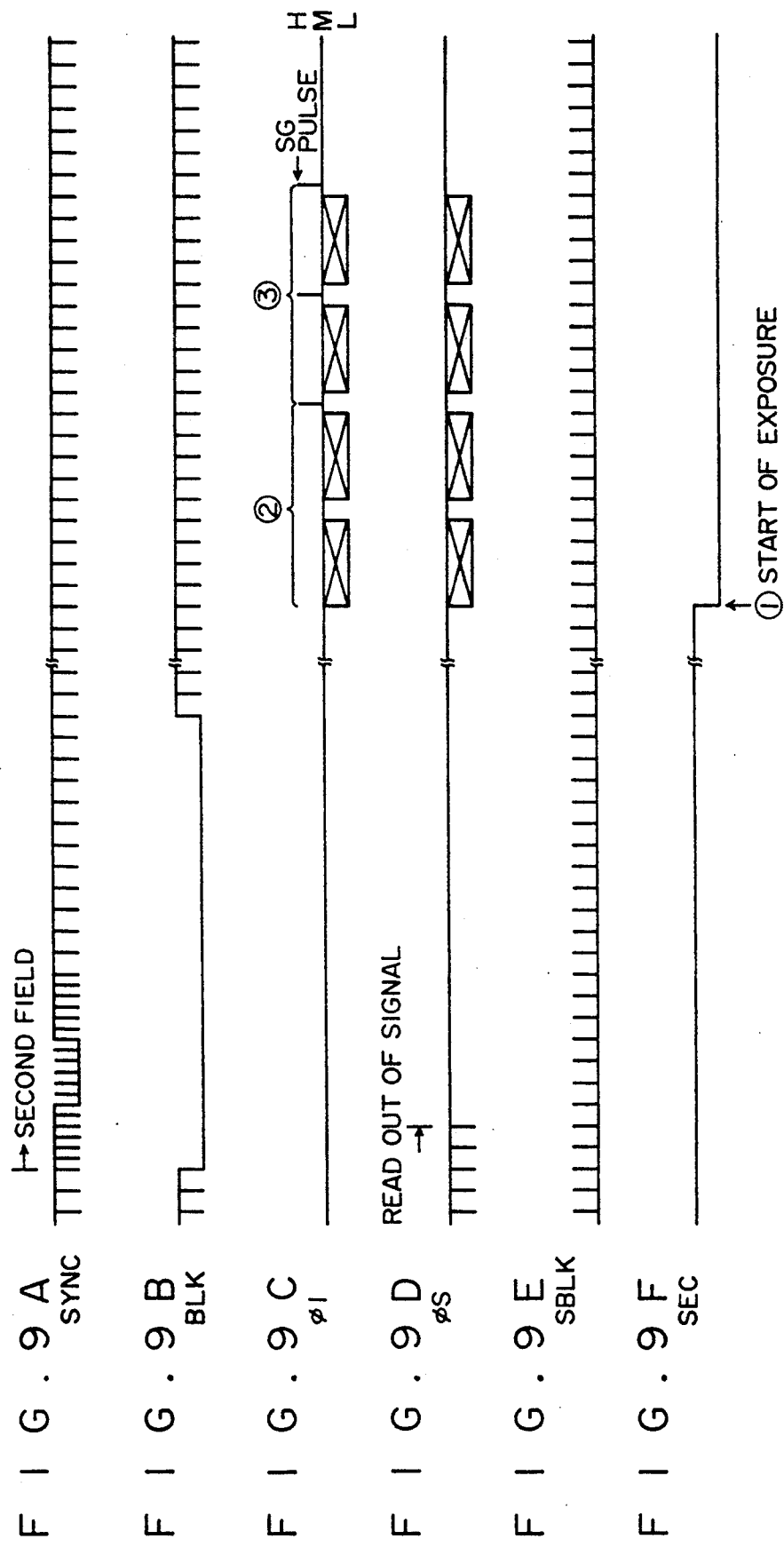

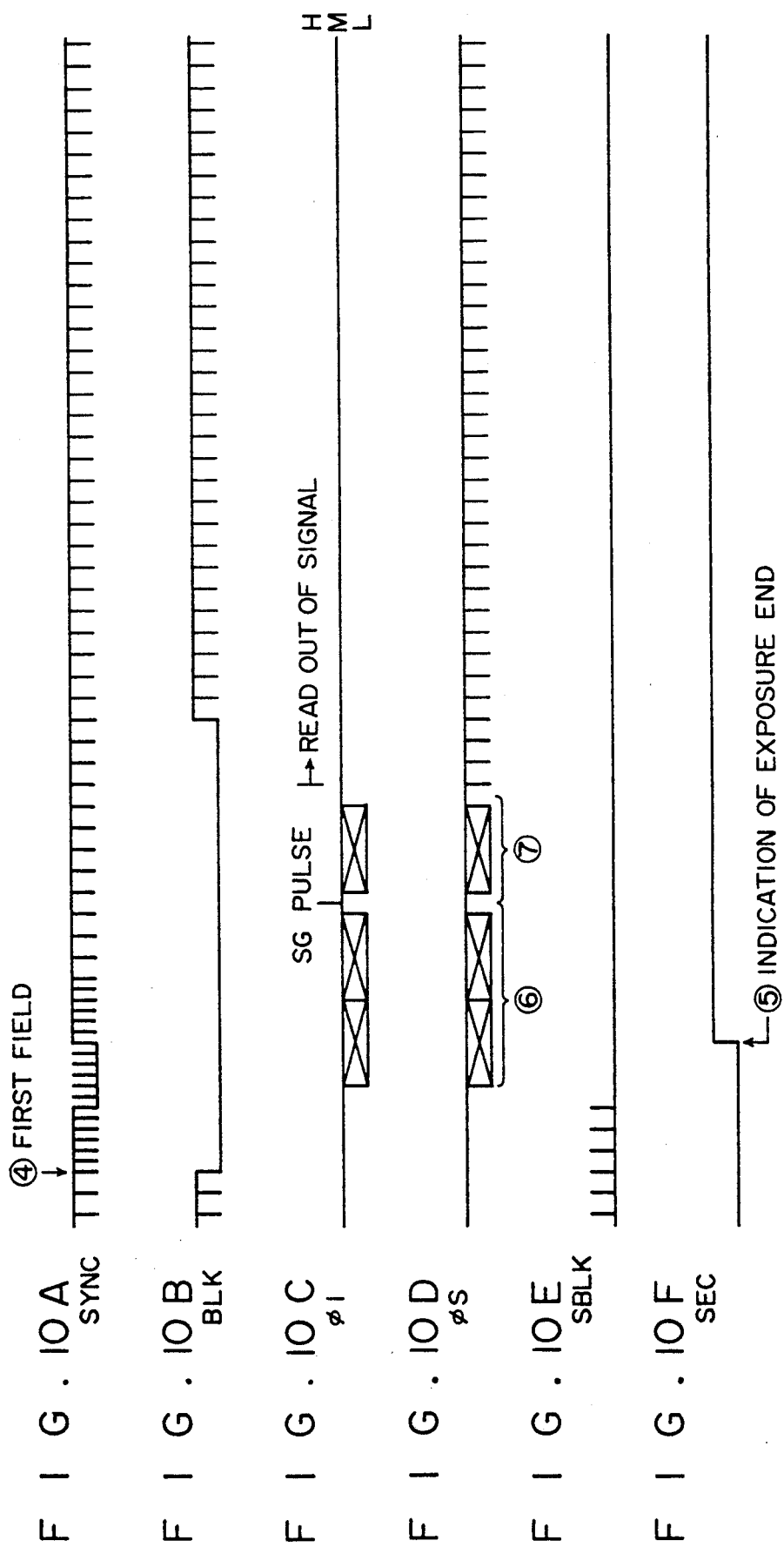

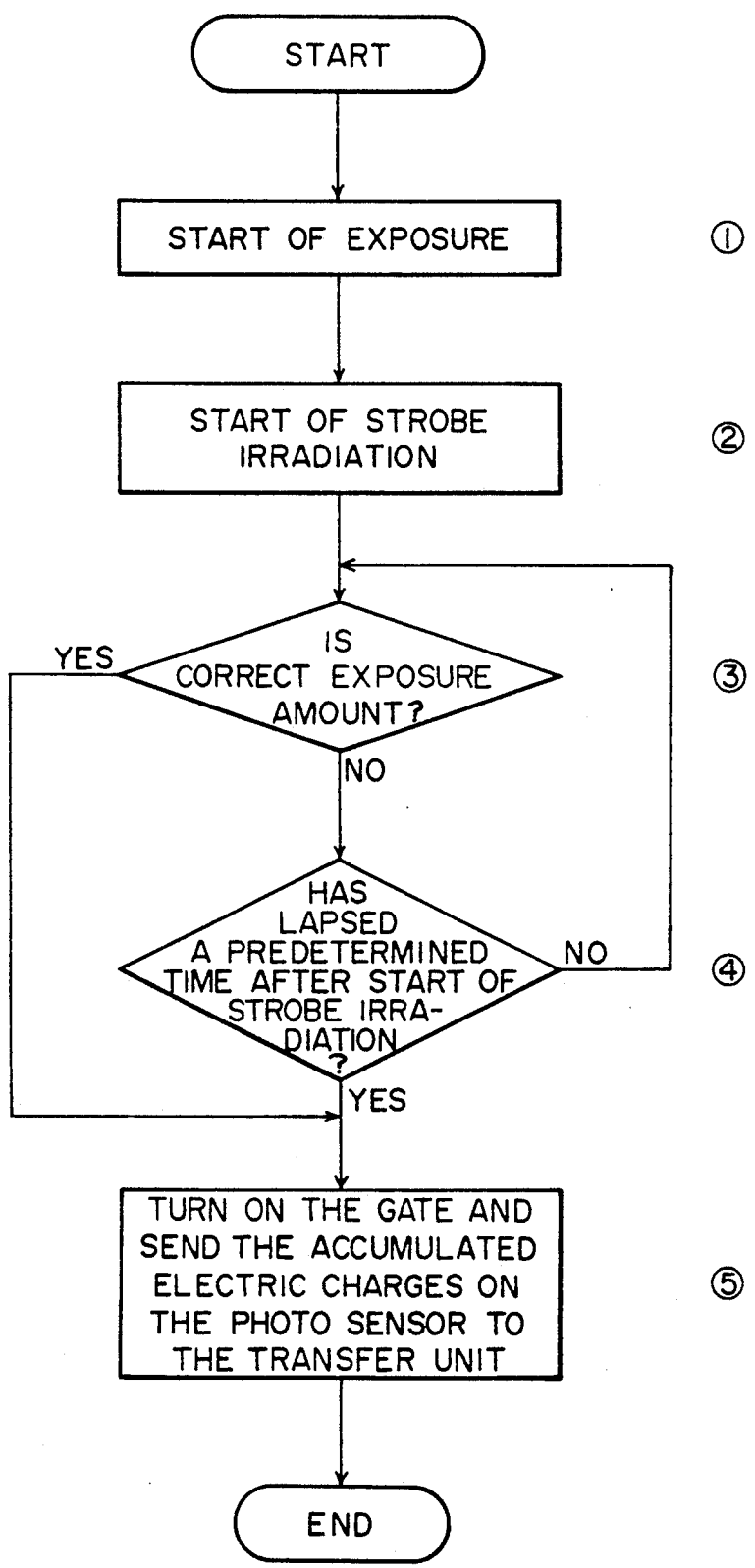

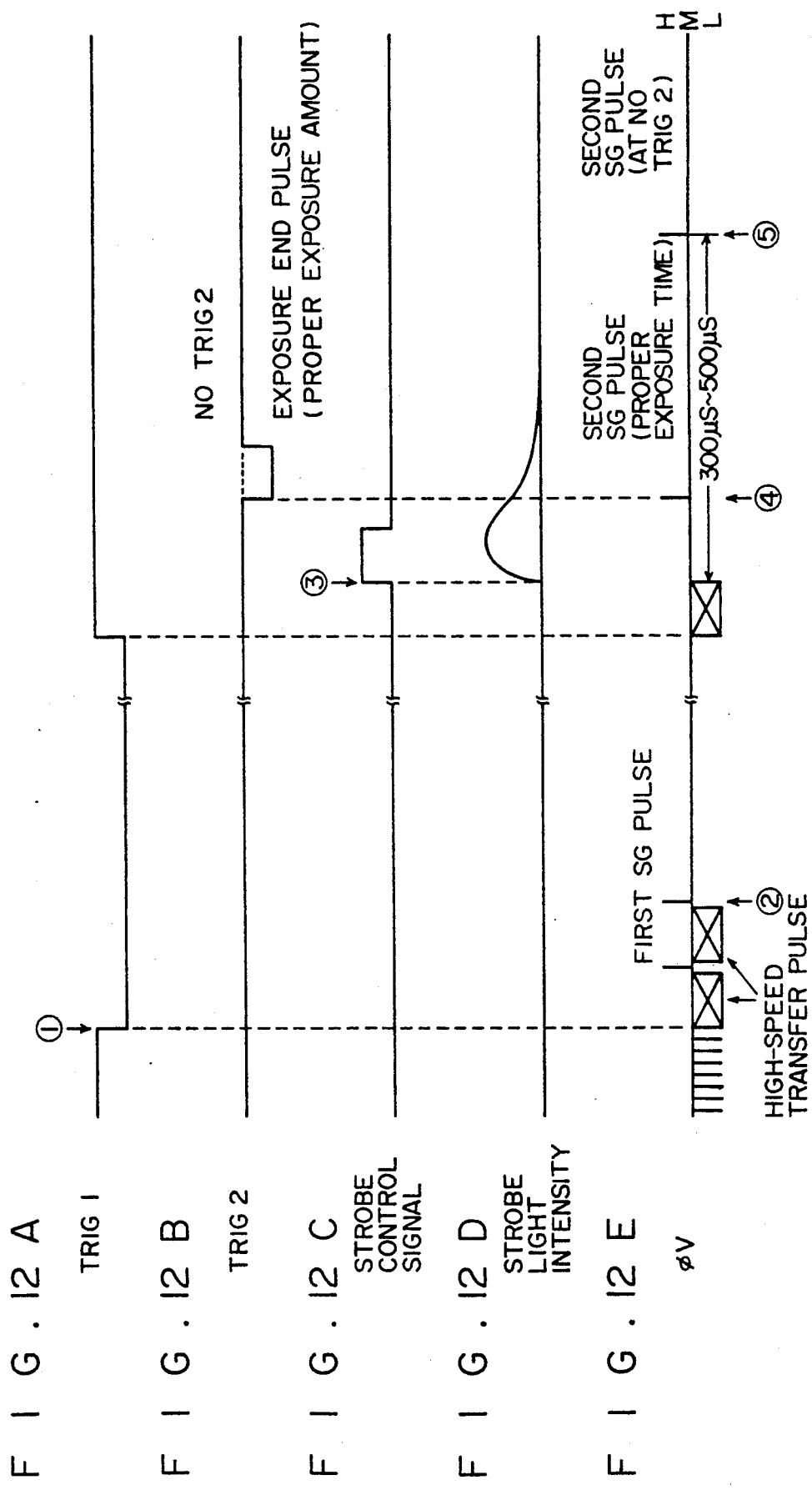

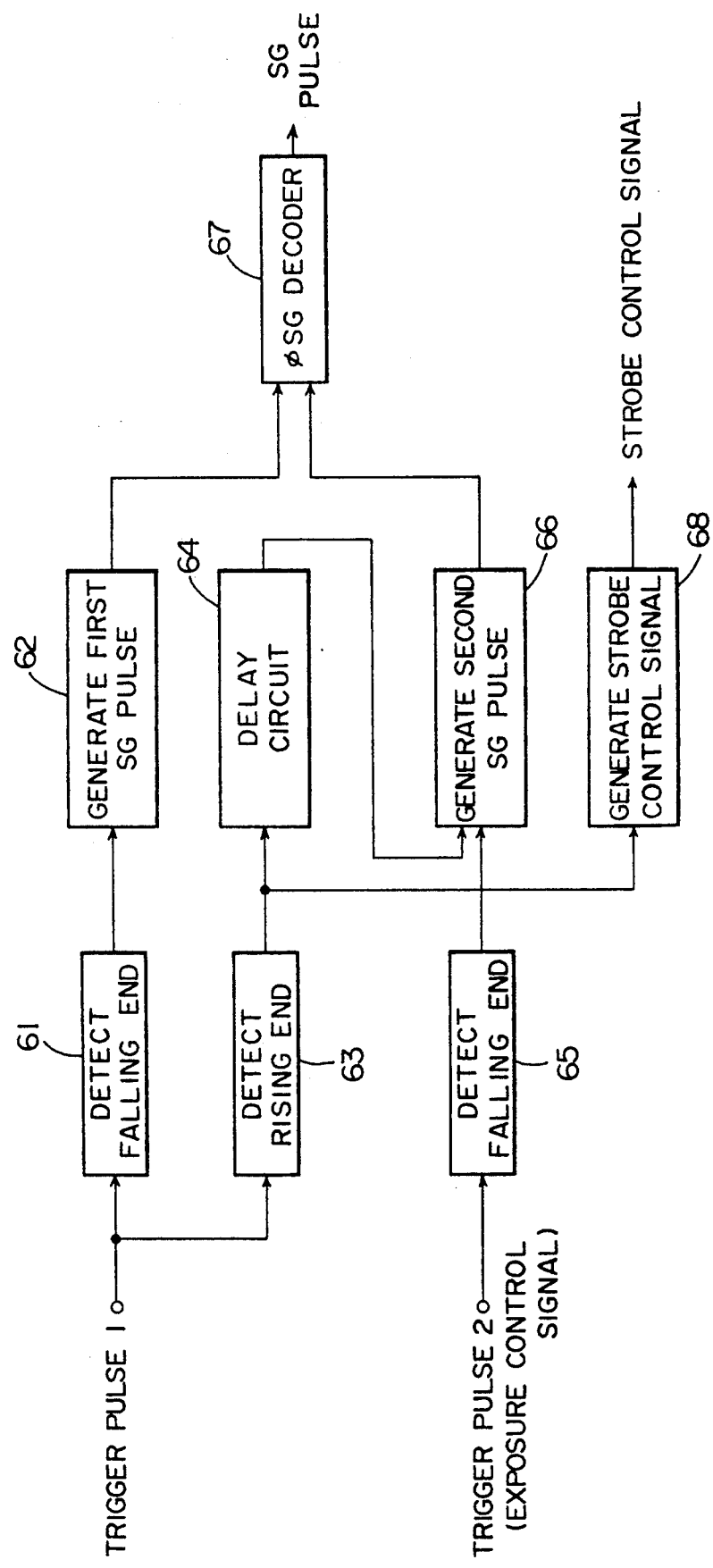

PRIOR ART

FIG. 14A TRIGGER

FIG. 14E C SYNC

FIG. 14F CBLK

FIG. 14G PG GATE

DRIVING APPARATUS FOR SOLID STATE IMAGE SENSORS INCLUDING A SWEEPING ACTION CONTROLLER

BACKGROUND OF THE INVENTION

1. Field of the Invention

This invention relates to a driving apparatus for solid state image sensors, which is used for an electronic still camera.

2. Description of the Prior Art

A solid state image sensor, such as a CCD is used as a light receiving element for an electronic still video camera. An electronic still video camera of this kind is adapted to convert optical information into an electric signal and store the resultant electric signal on an information recording medium, such as a video floppy. Accordingly, this video camera is advantageous unlike a silver halide film camera in that it does not require developing and is capable of transferring image information to a remote area.

In order to drive a solid state image sensor in such an electronic still camera, carrying out a photographing operation (including the exposing of a film and the transferring of electric charges) corresponding to one field or one frame only may meet the purpose unlike the case of a video camera. Unnecessary electric charges also occur in the light receiving element of CCD even before the starting of a practical exposure action. The generation of such electric charges is noticeable, especially, during an operation of an electronic shutter. Therefore, it is necessary that the unnecessary electric charges be swept out prior to the starting of the exposure.

A shutter button consists normally of a two-step push switch including S1, S2 (not shown), and is constructed so that S1 is turned on when the switch is pressed lightly, and so that both S1 and S2 are turned on when the switch is pressed deep. When S1 is turned on, a controlling microcomputer sends out instructions for the auto-focusing (AF), exposure controlling (AE) and sweeping of unnecessary electric charges to a range finding circuit, a photometric circuit and the solid state image sensor driving apparatus, respectively. The instructions for AF, AE and sweeping of unnecessary electric charges are sent out in repetition periodically until S2 has been turned on. When S2 is turned on, the microcomputer gives out an instruction for the exposure controlling to the solid state image sensor driving apparatus.

However, it is necessary in the above structure that the microcomputer has a special port for giving out an instruction for the sweeping of unnecessary electric charges. It is also necessary that the microcomputer directly gives out an instruction for sweeping out unnecessary electric charges with the instructions for AF and AE while S1 of the shutter button is pressed. Since the instruction for sweeping out the unnecessary electric charges is given out with the instructions for AE and AF, no problems arise in a regular case. However, when the operations are timed in a certain manner with an exposure instruction given out in a stage in which an unnecessary electric charge sweeping instruction has not yet been given out, unnecessary electric charges remain on the light receiving element in the solid state image sensor. Consequently, the unnecessary electric charges and the electric charges occurring due to the exposure are mixed to cause the quality of the image to decrease.

Such an electronic still camera is constructed so that it is suitable to take still pictures one by one. Namely, a horizontal synchronizing signal ($H_{SYNC}$) is reset (H reset) at the exposure starting time and the exposure finishing time. When the exposure and reading are carried out alternately and continuously under such conditions, $H_{SYNC}$s become discontinuous due to the resetting thereof, so that the image on the picture frame of the monitor is disarranged and not clearly seen. Such continuous exposure/reading operations are carried out when regulation and evaluation are made but, unless the image on the picture frame of the monitor becomes stable, regulation and evaluation cannot be made.

Such an electronic still camera is to take photographs continuously at a high speed in some cases. During such a continuous photographing operation, time is needed to sweep out unnecessary electric charges, expose a film and record the information, and these actions are repeated, so that there is a limit to the improving of the continuous photographing speed. Therefore, the continuous photographing speed cannot be improved satisfactorily. It is also necessary in a high-speed continuous photographing operation to synchronize the driving of the solid state image sensor with the rotating of the video floppy, and much time is spent in carrying out this operation.

FIGS. 14A-14G are timing charts for the operations of a driving apparatus for a solid state image sensor, which is used in a conventional electronic still camera. These timing charts are based on a case where a frame interline CCD is used. A case where the exposure of a film is carried out initially with a signal which is obtained by the exposure read out thereafter will be described.

In order to set the phases of rotation of the solid state image sensor driving apparatus and video floppy in agreement with each other, the resetting [the H resetting (the resetting of a horizontal synchronizing signal) and the V resetting (the resetting of a vertical synchronizing signal) ] is done (FIGS. 14D and 14E ①) 7H (horizontal scanning period) after the rising of the rear end of a PG pulse consiting of a reference signal of the rotation of the video floppy. As a result, the PG pulse is changed from a high level to a low level and passed through a gate, so that a H resetting signal and a V resetting signal are formed. The falling of a trigger signal designates (FIG. 14A ②) the starting of exposure, and a high-speed transfer pulse is generated immediately thereafter in a $\phi$I signal (FIG. 14B), which is one of CCD image area drive pulses to sweep out the unnecessary electric charge on a vertical transfer portion of the solid state image sensor. A sensor gate (SG) pulse (FIG. 14B ③) is then generated in the $\phi$I signal to sweep out the unnecessary electric charge on a light receiving element in the solid state image sensor by the high-speed transfer pulse. Then, the electric charge is accumulated in the light receiving element by a SG pulse ③'. The rising of the trigger signal designates (FIG. 14A ④) the stopping of the exposure, and a high-speed transfer pulse is generated immediately thereafter in the $\phi$I signal to sweep out the electric charge generated on a vertical transfer passage for the solid state image sensor. The signal charges accumulated in the light receiving element are then transferred (FIG. 14B ⑤) to a storage portion by the high-speed transfer pulse, after the electric charge of the light receiving element is transferred to V-CCD by the sensor gate pulse. Accordingly, the time between ③' and ⑤ is used practically as an exposure period. Then, the PG pulse is changed to a low level at the following SG pulse in the two SG pulses and passed through the gate, so that a H resetting pulse and a V resetting pulse are formed. As has been described above, the resetting is done again so that $V_{SYNC}$ occurs 7 H after the rise of the rear edge of the PG pulse (FIGS. 14D and 14E ⑥). Then, the reading of the electric charges generated due to the exposure from the solid state image sensor is started at the instant ⑦, so that the signal read is recorded in a recorder 3.

If the exposure is completed near a period $V_{SYNC}$ even in the case where the operations timed as mentioned above are carried out, an image cannot be outputted from the solid state image sensor. Specifically, if the period of the high-speed transfer pulse between ④ and ⑤ in FIG. 14 overlaps the period $V_{SYNC}$ and a period of 10 H direct before the $V_{SYNC}$ the start ⑦ of the signal reading may not be carried out properly, because a signal reading pulse generating circuit cannot be effected suitably when the period of the high-speed transfer pulse between ④ and ⑤ overlaps a counting in a V counter which becomes a standard of generation of $V_{SYNC}$.

Therefore, it is necessary that a system controlling microcomputer in the electronic still camera constantly monitors SYNC signals to control the operations so that the exposure is not completed during the period $V_{SYNC}$. Consequently, if the operations are timed in a certain manner, the waiting time occurs, so that the starting and finishing of exposure cannot be done at the desired time. Due to this waiting time, the continuous photographing speed cannot be increased.

The necessity that the resetting is done before and after exposure to match the phases of rotation of the solid state image sensor driving apparatus and video floppy also proves to be troublesome.

In order to photograph an object by using this kind of electronic still video camera with a strobe operated, it is necessary for the following reasons that the exposure be controlled with a high accuracy. In the case where CCD is used, a bright portion of an image is whitened if the exposure has exceeded an optimum level even slightly, and a dark portion of the image blackened if the exposure has become lower even slightly than the optimum level. In the case where a conventional silver halide film is used, an image formed thereon can be corrected during the development or printing even when the exposure deviates a little from an optimum level. Accordingly, in a conventional silver halide still camera, an exposure control operation can be carried out comparatively simply (called flashmatic control) by initially determining a distance of an object by an auto focusing means (automatic focus regulating means) on the basis of the equation, Guide number = Distance × Aperture, and then determining aperture on the basis of the same equation. Moreover, the distance may be set in eight steps with respect to the range of ∞ (infinite point) – 1 m.

In the case of an electronic still camera using CCD as a light receiving element, an optimum exposure control operation cannot be carried out by the flashmatic control method as mentioned above since the latitude of CCD is narrow. Therefore, it is necessary in the electronic still camera that the exposure be controlled with a high accuracy. For example, a method of controlling the rate of emission of a light regulating strobe in use is employed.

FIG. 15 is a block diagram of an exposure control system for a conventional electronic still camera. When a strobe control signal (emission starting signal) is inputted into an emission controller 41, the emission controller 41 operates a strobe 42 to emit light therefrom. When the light is emitted from the strobe 42, an object 43 is irradiated therewith, and a reflected light from the object 43 enters a light receiving element 45 through a light receiving lens 44. In an integrating circuit 46, a photoelectrically converted output from the light receiving element 45 is integrated simultaneously with the emission of light from the strobe 42. When an output from the integrating circuit 46 has reached a light regulating level which is determined by the sensitivity of CCD and a selected aperture, a stop signal is applied from a comparator 47 to the emission controller 41. Consequently, the emission controller 41 stops the light emitting action of the strobe 42.

FIG. 16 is a graph showing the conversion characteristics of the rate of emission of the strobe in this exposure ontrol system. Referring to FIG. 16, the longitudinal axis represents the light quantity of the strobe and the lateral axis time t. At an instant $t_1$, a strobe control signal is generated, and the quantity of light of the strobe increases suddenly as shown in FIG. 16. When an integrated value from the integrating circuit 46 has reached a light regulating level at an instant $t_s$, the emission of light from the strobe 42 stops. The hatched portion between these instants of this graph represents an actual quantity of the emitted light. A broken line in FIG. 16 is an emission curve of the strobe 42 with respect to the time in which the light is fully emitted. Let $t_2$ equal an instant at which the quantity of the emitted light becomes zero. An exposure control system in which $t_s$ is earlier than $t_2$ can be suitably used.

A solid state image sensor having an photo sensor, a transfer unit and a gate for transferring the accumulated electric charges in the photo sensor to the transfer unit may employ a method of regulating exposure by setting variable a period in which the gate is turned on, applying a gate pulse to the gate when a proper exposure has been attained, to turn on the gate, and reading out the accumulated electric charges in the photo sensor.

The strobe in use consists, for example, of a xenon tube. In order to control exposure by interrupting the emission of light from the strobe 42 as shown in FIG. 16, the construction of the circuit in the emission controller 41 becomes very complicated, and a difference occurs between the time at which an emission stopping signal is outputted and that at which the emission of light practically stops. Therefore, it is difficult to turn off the strobe with a high accuracy in the midst of the emission of light therefrom, and, especially, it is very difficult to turn off the strobe with a high accuracy in a rising part of the emission of light therefrom. Consequently, a photograph obtained in a photographing operation using even an automatically light regulating strobe with an aperture opened, especially, for the object near the camera, has a whitened image in many cases. Moreover, due to the complicated circuit structure, the dimensions of the system increases to cause the manufacturing cost of the apparatus becomes high.

In a method of regulating exposure by changing the time at which a pulse is applied to a gate in a solid state image sensor having a photo sensor, a gate and a transfer unit, a pulse for turning on the gate is applied thereto at an instant at which a proper exposure is attained, to read the signal charges. Accordingly, the controlling of the exposure during the time in which the exposure is in a proper level is done reliably. However, since the object is positioned in the distance, a proper exposure is not attained in some cases. In order to prevent this, it is necessary that a system controlling microcomputer outputs an emission stopping signal. This makes it necessary to carry out a control operation using a special port provided in the microcomputer, and causes the construction of the apparatus and an exposure control operation to become complicated.

SUMMARY OF THE INVENTION

The present invention has been developed in view of these points, and an object of the present invention is to provide a driving apparatus for solid state image sensors, capable of reliably carrying out the sweeping of the unnecessary electric charges in a solid state image sensor until the starting of the exposure.

The driving apparatus for solid state image sensors according to the present invention solving the above-mentioned problems is used for an electronic still camera for taking a still picture with a solid state image sensor, and adapted to generate timing signals for carrying out an exposure operation of the solid state image sensor and reading electric charges occurring in a light receiving portion of the solid state image sensor due to the exposure of the film, the apparatus being provided with a means for generating timing signals for carrying out the exposure and reading operations of the solid state image sensor, and a sweeping action controller adapted to control the generation of a timing signal for sweeping the electric charges, which are accumulated in the light receiving element in the the solid state image sensor, when a predetermined voltage signal is applied from an external system control circuit, the predetermined voltage being applied to the sweeping action controller before the starting of the exposure operation to carry out an operation of sweeping out the electric charges in the solid state image sensor.

In the driving apparatus for solid state image sensors according to the present invention, the predetermined voltage is applied to the sweeping action controller before the starting of the exposure operation, to make in the timing signal generating means the timing signal for the electric charge sweeping operation, and carry out the sweeping of the electric charges accumulated in the light receiving element in the solid state image sensor.

A further object of the present invention is to provide a driving apparatus for solid state image sensors, having a simple construction and capable of carrying out exposure and reading operations alternately and successively without resetting a synchronizing signal generating means.

The driving apparatus for solid state image sensors according to the present invention is used for an electronic still camera, and adapted to generate timing signals for carrying out an exposure operation of a solid state image sensor and its operation of reading electric charges occurring in a light receiving element in the solid state image sensor due to the exposure of the film, the apparatus being provided with a means for generating timing signals for carrying out the exposure and electric charge reading operations of the solid state image sensor, and a controller for making in said timing signal generating means timing signals for the exposure and reading operations alternately field by field when a predetermined voltage is applied from the outside thereto, the apparatus being constructed so that the exposure and electric charge reading operations of the solid state image sensor are carried out alternately in succession by applying the predetermined voltage to this controller.

In this driving apparatus for solid state image sensors according to the present invention, the controller is adapted to control the timing signal generating means so that the exposure and the reading of electric charges are carried out alternately in succession.

A further object of the present invention is to provide a driving apparatus for solid state image sensors, which is capable of improving the continuous photographing speed.

The driving apparatus for solid state image sensors according to the present invention capable of solving the above-mentioned problems is used in an electronic still camera for taking a still picture with a solid state image sensor, and adapted to generate timing signals for carrying out an exposure operation of the solid state image sensor and reading electric charges occurring in a light receiving portion of the solid stat image sensor due to the exposure of the film, the apparatus being provided with a means for generating timing signals for carrying out the exposure and reading operations of the solid state image sensor, and a sweeping action controller for generating in said means a timing signal for sweeping out the electric charges accumulated in the light receiving portion of the solid state image sensor, the apparatus being constructed so that the sweeping of the unnecessary electric charges in the light receiving element and vertical transfer unit in the solid state image sensor is done when the exposure for a first shot during a high-speed continuous photographing operation is started, and so that the sweeping of the unnecessary electric charges in at least one of the light receiving element and vertical transfer unit is omitted when the exposure for second and subsequent shots is started.

In the driving apparatus for solid state image sensors according to the present invention, the sweeping action controller is adapted to control the timing signal generating means so that the sweeping of the unnecessary electric charges in the light receiving element and vertical transfer unit in the solid state image sensor is done when the exposure for a first shot during a high-speed continuous photographing operation is started, and so that the sweeping of the unnecessary electric charges in at least one of the light receiving element and vertical transfer unit is omitted when the exposure for second and subsequent shots is started.

Another object of the present invention is to provide a driving apparatus for solid state image sensors, capable of starting and finishing exposure at desired times.

The driving apparatus for solving the above-mentioned problems is adapted to generate a timing signal and a synchronizing signal for an exposure operation of a solid state image sensor and its operation of reading an electric charge occurring due to the exposure, and provided with a means for generating horizontal and vertical synchronizing signals, a means for generating timing signals for the exposure and reading operations of the solid state image sensor, and a means for resetting the synchronizing signal generating means in accordance with a reference signal applied thereto from the outside, the reset means being constructed so that it resets the synchronizing signal generating means for the vertical synchronizing signal after the completion of the exposure operation of the solid state image sensor, the synchronizing signal generating means being constructed so that it generates a vertical synchronizing signal at only a predetermined time after it has been reset, and a horizontal synchronizing signal alone in a period other than the vertical synchronizing signal generating period.

In this driving apparatus for solid state image sensors according to the present invention, the reset means is adapted to reset the synchronizing signal generating means after the completion of the exposure operation of the solid state image sensor, and the synchronizing signal generating means generates the vertical synchronizing signal after the resetting has been done. In a period other than the predetermined time after resetting, the horizontal synchronizing signal alone is generated.

A further object of the present invention is to provide a driving apparatus for solid state image sensors, having a simple construction, capable of accurately regulating an exposure when a strobe is turned on, and having exposure control functions capable of reliably finishing the exposure even when proper exposure is not attained.

The driving apparatus for solid state image sensors, adapted to take pictures with strobe light by driving a solid state image sensor is provided with a photo sensor adapted to generate an electric charge when it receives light, a vertical transfer unit adapted to vertically transfer the electric charge generated in the photo sensor, a horizontal transfer unit adapted to horizontally transfer the electric charge from the vertical transfer unit to output the same to the outside, and a gate disposed between the photo sensor and the vertical transfer unit and capable of being switched to an ON-state or an OFF-state, the apparatus having a means for starting an exposure after the electric charges accumulated in the photo sensor have been transferred to the vertical transfer unit, a means for giving instructions to turn on a strobe on the basis of a predetermined shutter speed after the lapse of a predetermined period of time, a first exposure ending means for turning on the gate when proper exposure has been attained in the midst of an emission of light from the strobe and transferring signal charges occurring in the photo sensor to the vertical transfer unit to finish the exposure, and a second exposure ending means for turning on the gate after the emission of light from the strobe has been completed and transferring the signal charges occurring in the photo sensor to the vertical transfer unit to finish the exposure.

In this driving apparatus for solid state image sensors according to the present invention, the strobe is turned on a predetermined period of time after the starting of the exposure of the photo sensor in the solid state image sensor, and the gate is turned on by the first exposure ending means when the exposure has reached a predetermined level, to finish the exposure. When proper exposure is not attained in spite of the emission of light from the strobe, the gate is turned on by the second exposure ending means after the completion of the emission of light from the strobe, to finish the exposure.

The above and other objects and characteristics of the present invention will now be described with reference to the drawings.

Figure 7:
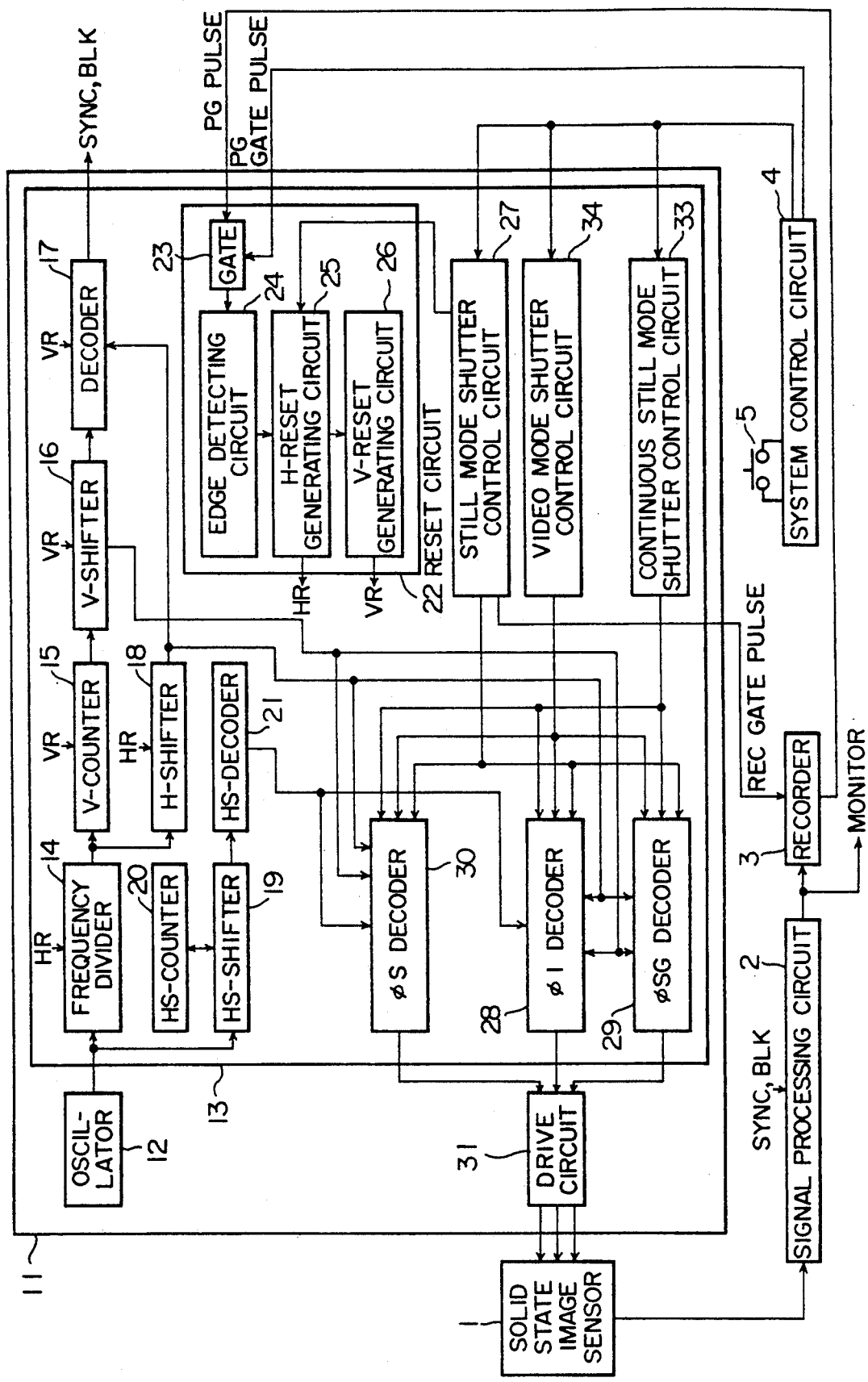
Figure 11A:
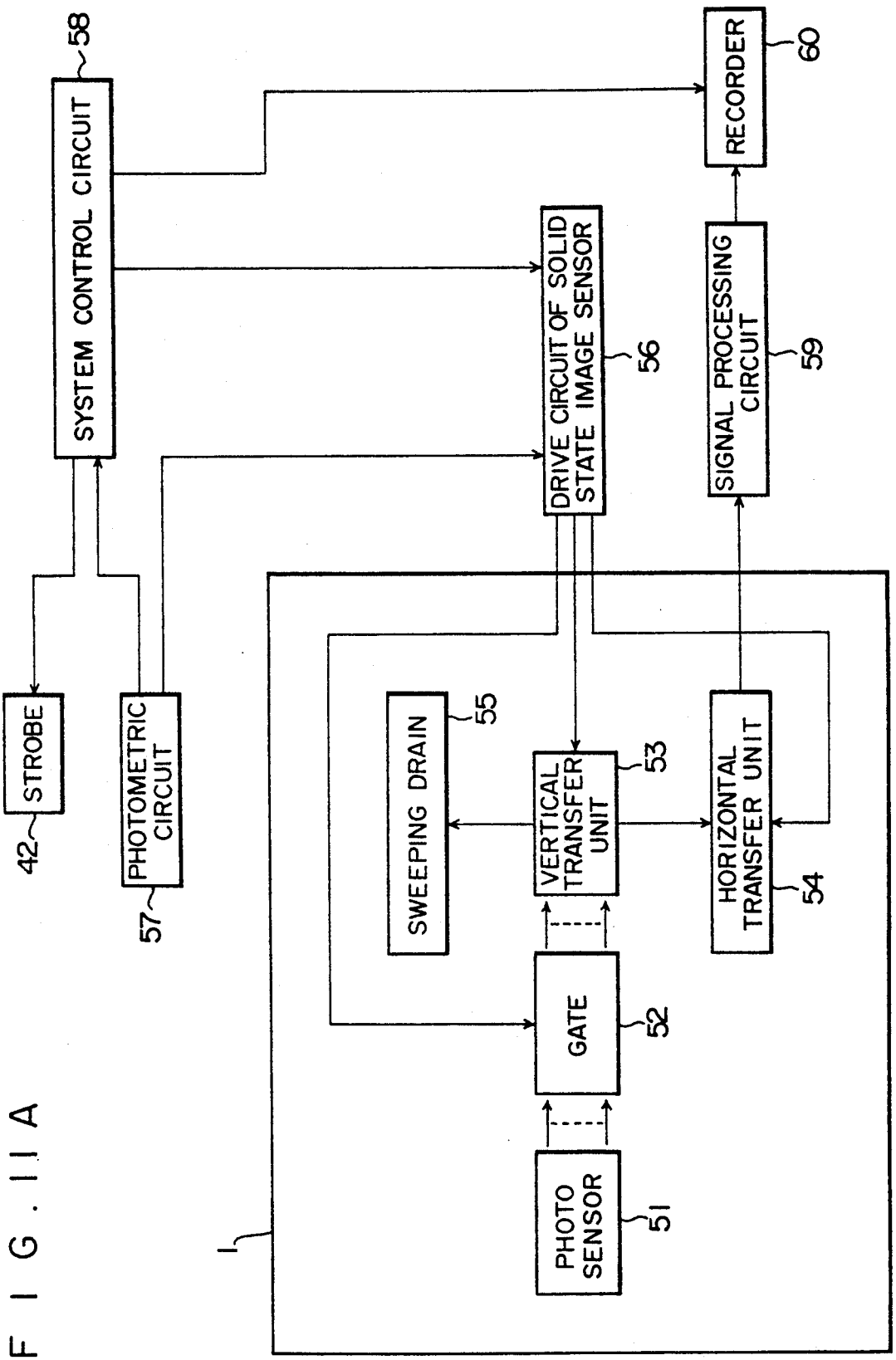
Figure 15:
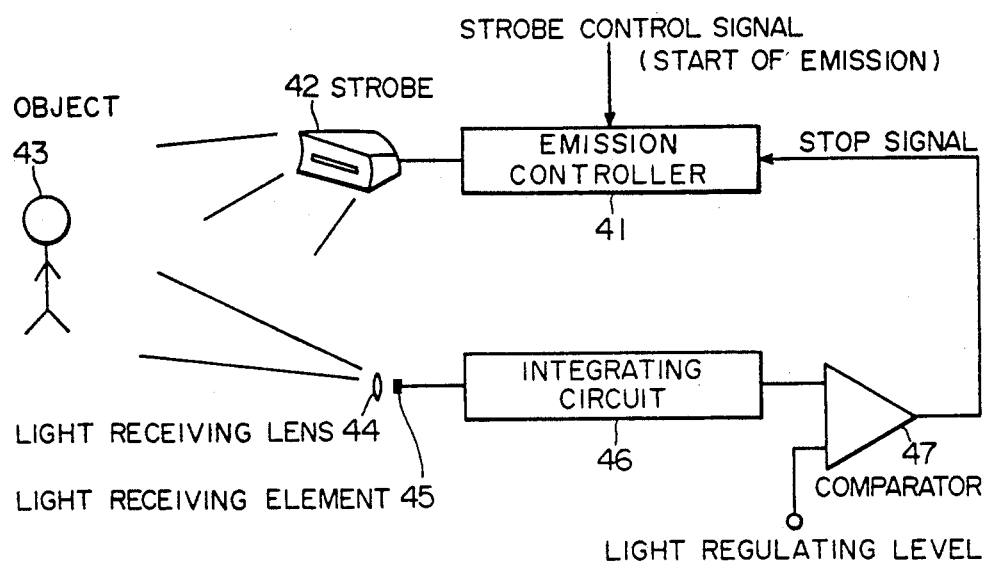
Figure 16:
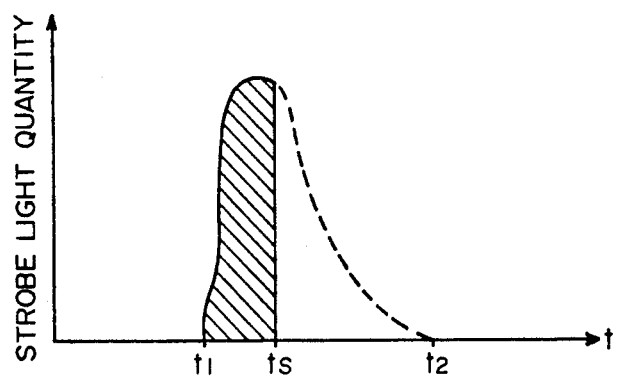

FIG. is a flow chart showing an operation of a principal portion of the apparatus according to the present invention;

FIGS. 4A to 4D are time charts showing the waveforms in the embodiment of the present invention;

FIGS. 5A to 5D are time charts showing the waveforms in another embodiment of the present invention;

FIGS. 6A to 6J are time charts showing the waveforms during an operation;

FIG. 7 is a block diagram showing the construction of further embodiment of the present invention;

FIGS. 8A to 8J are time charts showing an operation of still another embodiment of the present invention;

FIGS. 9A to 9F are time charts showing the waveforms obtained during the exposure in a further embodiment of the apparatus according to the present invention;

FIGS. 10A to 10F are time charts showing the waveforms obtained during a reading operation in this embodiment;

FIG. 11A is a block diagram of another embodiment of the present invention;

FIG. 11B is a flow chart showing an operation of this embodiment;

FIGS. 12A to 12E are time charts showing the waveforms of signals at various parts of the embodiment;

FIG. 13 is a block diagram of a principal portion of this embodiment;

FIGS. 14A to 14G are time charts of a conventional apparatus;

FIG. 15 is a block diagram showing an example of the construction of a conventional apparatus, and FIG. 16 is a diagram showing the emission characteristics of a strobe used in the conventional apparatus.

DESCRIPTION OF THE PREFERRED EMBODIMENTS

Figure 1:
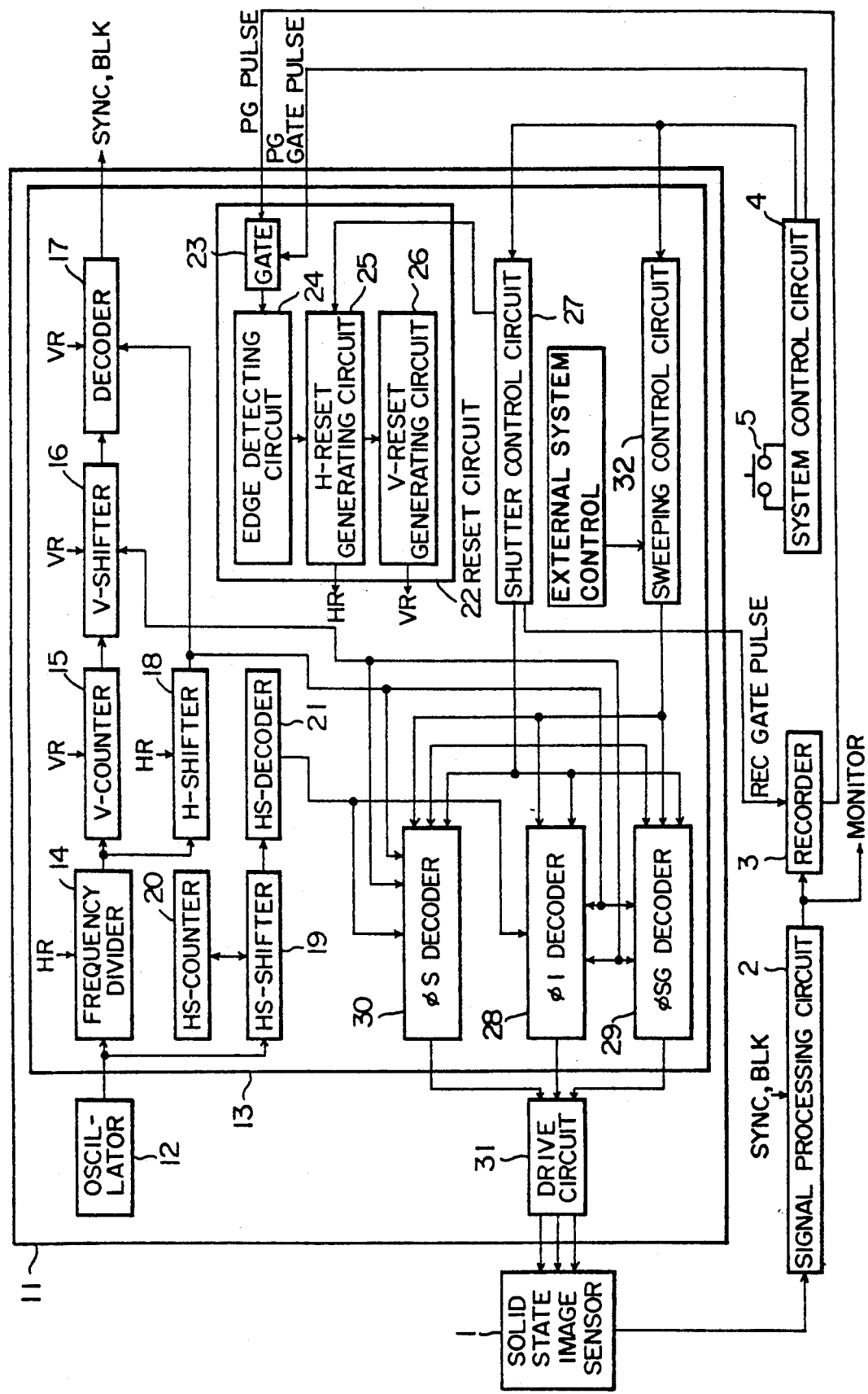
FIG. 1 is a block diagram showing the construction of an embodiment of the present invention.

FIG. 1 is a block diagram showing an example of the construction of an embodiment with its peripheral parts of the present invention. Referring to FIG. 1, a reference numeral 1 denotes a solid state image sensor adapted to generate an image signal when an exposure of a film is carried out, 2 a signal processing circuit adapted to convert an image signal from the solid state image sensor 1 into a projected image signal in accordance with a synchronizing signal, such as SYNC and BLK, 3 a recorder adapted to record a projected image signal on a video floppy in accordance with a REC gate pulse, and 4 a system control circuit adapted to control various parts collectively and generate a trigger pulse and a PG gate pulse in accordance with an operation of a shutter button 5. This system control circuit 4 contains a microcomputer, and generates and controls various kinds of pulses. The shutter button 5 consists of a two-step push switch including S1 and S2 (not shown), wherein S1 is turned on when it is pressed lightly, and both S1 and S2 are turned on when it is pressed deeply. A reference numeral 11 denotes a solid state image sensor driving apparatus adapted to apply a driving pulse to the solid state image sensor 1, 12 an oscillator adapted to generate a reference signal, 13 a driving pulse generating circuit adapted to produce a driving pulse on the basis of the reference signal, 14 a frequency divider adapted to produce a signal of a horizontal scanning frequency ($f_H$) on the basis of the reference signal, 15 a V-counter adapted to produce a signal of a vertical scanning frequency ($f_V$) on the basis of the $f_H$ signal, 16 a V-shifter adapted to produce a plurality of $f_V$ signals of different phases on the basis of the $f_V$ signal, 17 a decoder adapted to produce a synchronizing signal, 18 a H-shifter adapted to produce a plurality of $f_H$ signals of different phases on the basis of the $f_H$ signal, 19, 20 a HS shifter and a HS-counter, respectively, adapted to produce high-speed transfer (HS) signals for the solid state image sensor 1 on the basis of the reference signal, and 21 a HS decoder. The reference letter HR or VR shown above the parts 14–18 denote a terminal to which the H-reset signal or the V-reset signal is applied. The H-reset signal and V-reset signal are generated when an operation is carried out synchronously with the recorder 3. A reference numeral 22 denotes a reset circuit adapted to receive the PG pulse and the trigger pulse and produce the H-reset signal and a V-reset signal, 23 a gate through which only a first PG pulse generated after the completion of exposure is passed. This gate 23 is reset by a PG gate pulse from the system control circuit 4 and the execution of the exposure, so that when the PG gate pulse is a high level only a first PG pulse generated after the resetting is passed and when the PG gate pulse is a low level no PG pulse is passed. 24 a circuit for detecting an edge of the PG pulse which has passed through the gate 23, and 25 a circuit for producing the H-reset signal on the basis of the edge of the PG pulse or the trigger pulse, 26 a circuit for producing the V-reset signal. Although the connection for supplying the H-reset signal and the V-reset signal is omitted in FIG. 1, these signals are applied to the parts 14–18 as mentioned above. A reference numeral 27 denotes a shutter control circuit adapted to produce a shutter control signal for controlling the exposure on the basis of the trigger pulse outputted from the system control circuit 4, 28, 30 a $\phi I$ system decoder and $\phi S$ system decoder adapted to produce a solid state image sensor driving signals ($\phi I1 \sim 4$, $\phi S1 \sim 4$) on the basis of the HS signal, $f_H$ signal and $f_V$ signal, 29 a $\phi SG$ system decoder adapted to produce exposure starting and finishing signals (SG signals) for the solid state image sensor on the basis of the $f_H$ signal, $f_V$ signal and shutter control signal, 31 a drive circuit adapted to amplify the output signals from the decoders 28, 29, 30 and supply the resultant signals as driving signals to the solid state image sensor, 32 a sweeping control circuit adapted to control the generation of a driving pulse for the sweeping of the solid state image sensor 1 in accordance with an instruction from the system control circuit 4.

Figure 2:
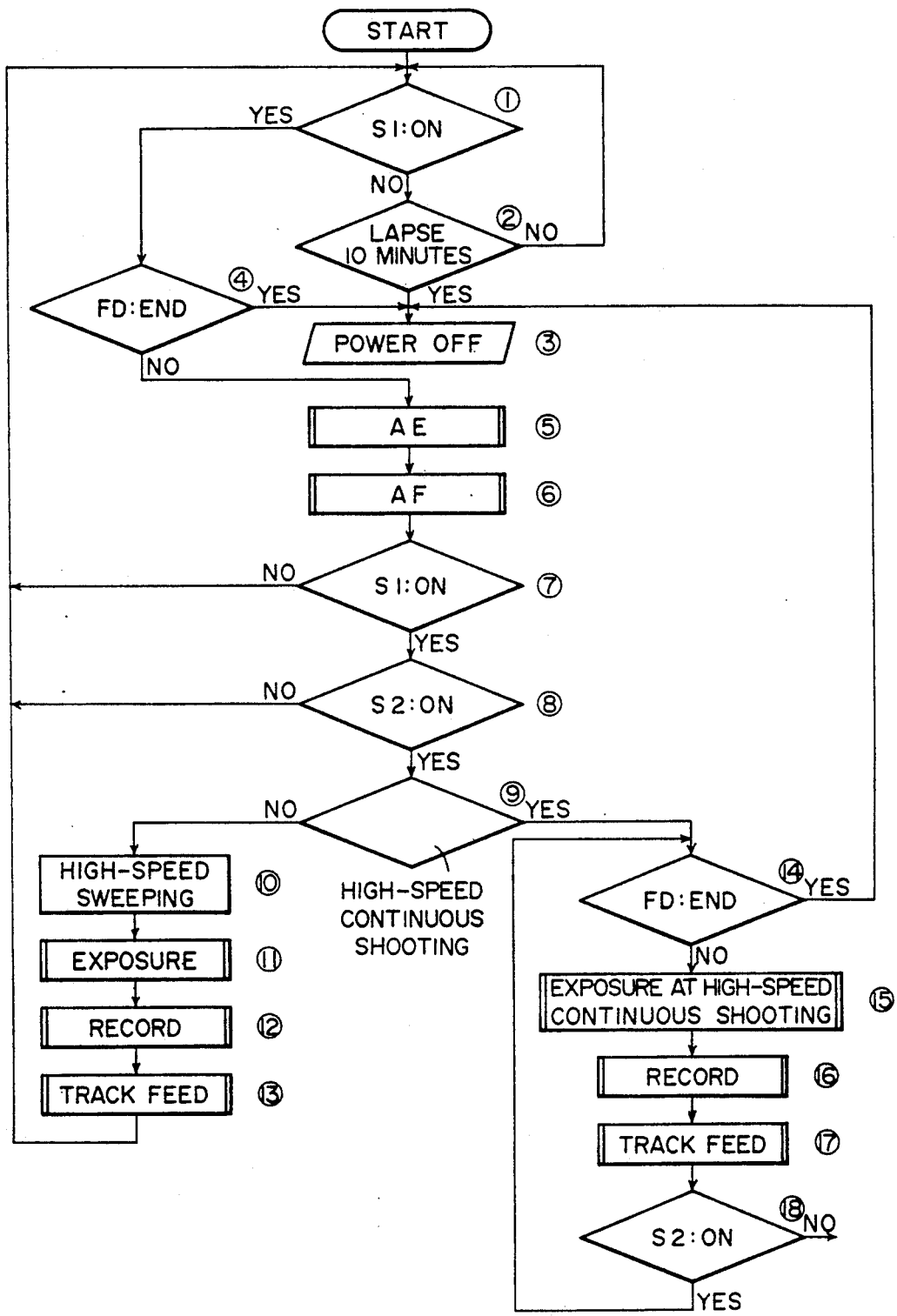
FIG. 2 is a flow chart showing a general operation of the apparatus according to the present invention.

FIG. 2 is a flow chart showing the operational condition of the microcomputer contained in the system control circuit 4. The outline of an operation of the electronic still camera will now be described with reference to FIGS. 1 and 2.

The microcomputer monitors (Step ①) S1 in the shutter button 5 as to whether it is pressed. If S1 is not operated for 10 minutes (Step ②), the power source is automatically turned off (Step ③). When S1 is turned on, the recording condition of the video floppy in the recorder 3 is checked (step ④). If all the tracks in the video floppy have been recorded, the recording cannot be done any more, so that the power source is turned off (Step ③). If an unrecorded track is still left, instructions to carry out the automatic exposure regulation (AE: Step ⑤) and the automatic focusing (AF: Step ⑥) are given to the photometric circuit and range finding circuit. In this stage of the operation, S1 and S2 in the shutter button are monitored (Steps ⑦ and ⑧) as to whether they are pressed. If S2 is in an OFF-state, the order of procedure is returned to Step ①. When both S1 and S2 are turned on, the photographing mode is checked (Step ⑨) whether it is a high-speed continuous photographing mode. If the photographing mode is not a high-speed continuous photographing mode, an instruction to carry out a high-speed sweeping of the electric charges in the solid state image sensor 1 is given (Step ⑩) to the driving apparatus 11. This high-speed sweeping operation is applied first to the electric charges on the vertical transfer unit in the solid state image sensor 1, and then to those on the light receiving elements. When the high-speed sweeping operation has been completed, an instruction to carry out the exposure is given (Step ⑪). When the exposure has been finished, a recording instruction is given (Step ⑫) to the recorder 3, and, when the recording has been finished, an instruction to feed the tracks on the recording head of the recorder is given (Step ⑬). When these operations have been completed, the order of procedure is returned to Step ①. In order to carry out a high-speed continuous photographing operation, the recording condition of the video floppy is judged (Step ⑭). If the video floppy is judged to be in inadequate condition, power is shut off (Step 3); if the video floppy is judged to be suitable an instruction to carry out the recording during a high-speed photographing operation is given (Step ⑮). The sweeping operation of the solid state image sensor 1 during this recording operation is different from that in a regular case. This operation will be described in detail later. If S2 is in an ON-state after the completion of the recording (Step ⑯) and track feeding (Step ⑰) operations, the Steps ⑭ - ⑰ are repeated.

Figure 3:
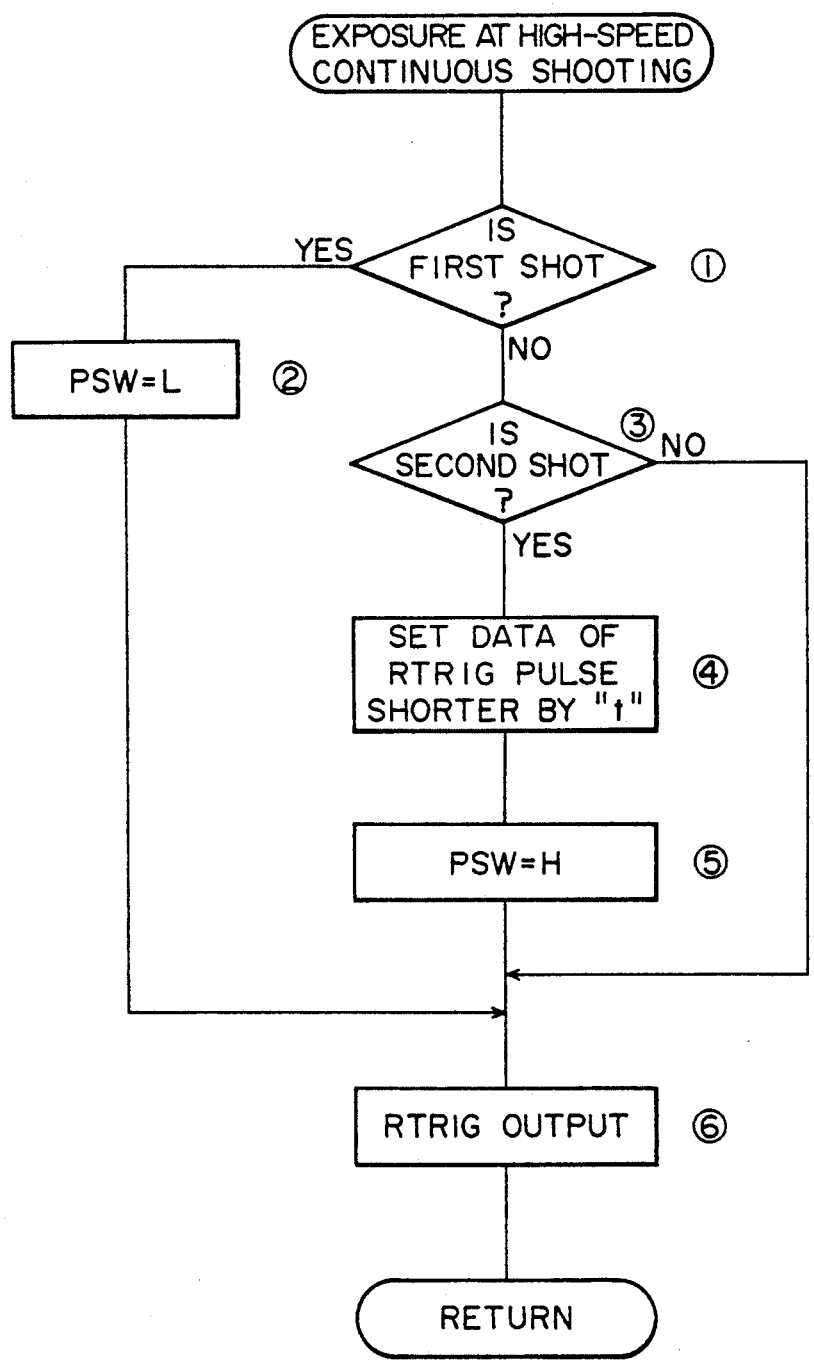

FIG. 3 is a flow chart showing the details of an exposure operation carried out while pictures are taken continuously at a high speed. In order to carry out a high-speed continuous photographing operation, the photographing condition is checked (Step ①) whether a shot to be now taken in a first shot, and, if it is a first shot, a PSW pulse for controlling the sweeping of electric charge is set to a L-level. A trigger pulse RTRIG for determining the exposure time is then outputted (Step ⑥). If the shot to be now taken is a second shot, the data corresponding to the pulse width of the RTRIG are set (Step ④) shorter by t, and a PSW pulse to a H-level (Step ⑤), and a RTRIG is then outputted (Step ⑥). The sweeping control circuit 32 is operated so as to omit the sweeping operation for at least one of the receiving element and the vertical transfer unit at the exposure starting time when the PSW pulse has attained a H-level. When third and subsequent shots are taken, a RTRIG shorter by t is outputted. The purpose of reducing the pulse width of RTRIG for the second and subsequent shots by t as mentioned above is to set the substantial exposure time in this case equal to that in the case where a first shot is taken, because the sweeping (which takes a period of time t) of V-CCD on the solid state image sensor 1 for a photographing operation in the former case is omitted. Specifically, in the continuous photographing operation the light receiving element or V-CCD is transferred by the preceeding shot, so that the light receiving element or V-CCD has no unnecessary electric charge and accordingly the sweeping can be omitted in case of the continuous photographing operation.

FIGS. 4A–4D are time charts showing the waveforms of signals generated during a high-speed continuous photographing operation. A high-speed continuous photographing operation will now be described with reference to FIGS. 1-3 and 4A-4D.

When the shutter button 5 is pressed deep (both S1 and S2 are turned on), a trigger signal from the system control circuit 4 falls (FIG. 4A ①), and an instruction to start exposure is given to the shutter control circuit 27. At the same time, a H-reset pulse HR is generated in the circuit 25, and the H-resetting with respect to a horizontal synchronizing signal $H_{SYNC}$ is done practically. The electric charge sweeping pulses are then generated (in a period A in FIGS. 4B and 4C) in a φI pulse from the φI system decoder 28 and φS pulse from the φS system decoder 30, and the electric charges on the vertical transfer unit V-CCD in the solid state image sensor 1 are swept out. The electric charges sweeping pulses then occur (in the period B in FIGS. 4B and 4C) in the φI and φS pulses, and the unnecessary electric charges on the light receiving element in the solid state image sensor 1 are swept out. This sweeping operation (in the periods A and B in FIG. 4C) is identical with that (Step ⑩ in FIG. 2) carried out before a regular exposure operation. When a predetermined period of exposure time has elapsed, or, when proper exposure has been attained, a trigger signal rises (FIG. 4A ④), and an exposure stopping instruction is given. At this time, a H-reset pulse HR is generated in the circuit 25, and the H-resetting with respect to the horizontal synchronizing signal HSYNC is done practically. The electric charges accumulated on the vertical transfer unit V-CCD in the solid state image sensor are swept out in a period C. A high-level sensor gate (SG) pulse occurs (FIG. 4B ⑤) in the φI pulse immediately after this sweeping operation, and the electric charges accumulated on the light receiving element in the solid state image sensor are transferred to the storage unit. Accordingly, the period between ③ and 5 is an actual exposure period.

The H-resetting and V-resetting by a PG pulse from the recorder 3 are then done so that $V_{SYNC}$ occurs 7 H after the rise of the rear edge of the PG pulse constituting a rotation reference signal for the video floppy.

When a first PG pulse after the completion of the exposure is outputted from the recorder 3, it passes through the gate 23 due to a PG gate pulse, and the rise of the rear edge of the PG pulse is detected in the edge detecting circuit 24, a H-reset signal and a V-reset signal being produced in the circuits 25, 26, respectively, on the basis of what is thus detected. The H-reset signal is applied to the frequency divider 14 and H-shifter 18, and the V-reset signal to the V-counter 15, V-shifter 16 and decoder 17, to be reset. Accordingly, a solid state image sensor driving signal generated in the driving apparatus 11 becomes synchronous with the rotation of the video floppy in the recorder 3.

The electric charges occurring due to the exposure and accumulated on the solid state image sensor 1 are then read out from the storage portion thereof (in the period E in FIG. 4C). The exposure of the first shot is completed by carrying out these operations. When it is judged as the continuous photographing mode or the pressing state of the release is detected, for example, PSW becomes a high level "H" (FIG. 4D ⑦), which is the time for driving CCD following a second shot in the continuous photographing operation.

When the time for exposing the second shot has come, the trigger signal from the system control circuit 4 falls (FIG.4A ⑥), and an exposure starting instruction is given to the shutter control circuit 27, so that the electric charge on the light receiving element is transferred to V-CCD by a SG pulse ⑥' and the H-resetting is done practically at this time. The electric charge sweeping pulses then occur (in the period F in FIGS. 4B and 4C) in the φI pulse from the φI system decoder 28 and φS pulse from the φS system decoder 30, and the unnecessary electric charges on the light receiving element in the solid state image sensor 1 are swept out. This sweeping operation is applied to the light receiving element alone, and such an operation for the electric charges on V-CCD is omitted. When a predetermined period of exposure time has elapsed, or, when proper exposure has been attained, the trigger signal rises (FIG. 4A ⑧), and an exposure stopping instruction is given. The H-resetting is done at this time. The electric charges accumulated on the vertical transfer unit V-CCD in the solid state image sensor are then swept out in the period G. A high-level SG pulse occurs (FIG. 4B ⑨) in the φI pulse immediately after the completion of this sweeping operation, and the electric charges accumulated on the light receiving element in the solid state image sensor 1 are transferred at a high speed to the storage portion thereof (in the period H). Accordingly, the period between ⑦ and ⑨ is an actual exposure period in this case.

The H-resetting and V-resetting by the PG pulse from the recorder 3 are thereafter carried out.

The electric charges occurring due to the exposure and accumulated on the image sensor 1 are then read out in the period I in FIG. 4C from the storage portion thereof. The exposure of the second shot is completed by these operations. The exposure of a third and subsequent shots is carried out in accordance with the same timing as in the exposure of the second shot.

FIGS. 5A-5D are time charts showing another example of the operation of the present invention. Since the operation shown in these drawings is substantially identical with that shown in FIG. 2, a detailed description will be omitted. In the example of FIG. 5, the sweeping operations with respect to both the light receiving element and V-CCD, which are carried out in the previously-described example at the time of starting the exposure of second and subsequent shots, are omitted. Therefore, it is necessary that a RTRIG pulse for second and subsequent shots be shortened by 2 t (the light receiving element sweeping time and V-CCD sweeping time).

As mentioned above, since a part of the sweeping operation at the time of starting the exposure of second and subsequent shots during a high-speed continuous photographing operation is omitted, the time other than the actual exposure time becomes shorter. This enables a continuous photographing speed (number of shots/sec) to be increased.

As described in detail above, because a part of the electric charge sweeping operation for second and subsequent shots during a high-speed continuous photographing operation is omitted in the above embodiment of the present invention when it is judged as the second and subsequent shots in the high-speed continuous photographing operation, the time other than the actual exposure time can be shortened, and the continuous photographing speed can be increased. Accordingly, a driving apparatus for solid state image sensors, which is capable of increasing the continuous photographing speed, can be obtained.

FIGS. 6A–6J are time charts showing examples of signals outputted from still another embodiment of the solid state image sensor driving apparatus 11 according to the present invention and its peripheral parts. Referring to these time charts, FIG. 6A shows a trigger pulse applied from a system control circuit 4 to a shutter control circuit 27, FIG. 6B a sweeping control pulse applied from the system control circuit 4 to a sweeping control circuit 32, FIGS. 6C–6F $\phi$I1–I4 pulses for driving a light receiving element (image area) in a solid state image sensor 1, and FIGS. 6G–6J $\phi$S1–$\phi$S4 pulses for driving an accumulator (storage area) in the image sensor 1. What are shown in FIG. 6 correspond to the condition in which S2 in a shutter button is also put to an ON-state after S1 therein was already turned on.

The operation of this embodiment will now be described with reference to FIG. 1 and FIGS. 6A–6J.

Suppose that the shutter button 5 is pressed lightly to cause S1 alone to be turned on. At this time, the sweeping control pulse (FIG. 6B) from the system control circuit 4 is in a high level. Accordingly, the $\phi$I decoder 28, $\phi$SG decoder 29 and $\phi$S decoder 30 generate pulses for driving the solid state image sensor 1 (the period A in FIGS. 6C–6J). Accordingly, the electric charges (unnecessary electric charges) occurring on the image sensor 1 are swept out. During this sweeping operation, a line shift pulse, that is, a pulse for shifting by one scanning line in a horizontal scanning period or by one pixel portion in the vertical direction in CCD is utilized to read out and sweep out such electric charges at the end of each field period.

When the shutter button is pressed deep (both S1 and S2 are turned on, the sweeping control pulse (FIG. 6B) from the system control circuit 4 falls (FIG. 6B ①), and the above-mentioned sweeping operation stops. At substantially the same time, the trigger signal TRIG falls (FIG. 6A ②), and an exposure starting instruction is given to the shutter control circuit 27. At this time, a H-reset pulse HR is generated in the circuit 25, and the H-resetting with respect to a horizontal synchronizing signal HSYNC is carried out. A high-speed transfer pulse is then generated (in the period B in FIG. 6C) in the $\phi$I1–4 pulses from the $\phi$I system decoder 28, and the unnecessary electric charges on a vertical transfer unit V-CCD in the solid state image sensor 1 are swept out. A high-speed transfer pulse and SG pulse (in the period C in FIGS. 6C and 6E) are thereafter generated in the $\phi$I1 and $\phi$I3 pulses, and only the high-speed transfer pulse is generated in the other $\phi$I2 and $\phi$I4, so that the unnecessary electric charges accumulated on the light receiving element in the image sensor 1 are swept out separately with respect to different fields. A high-speed transfer pulse and SG pulse (the period D and ③ in FIGS. 6C and 6E) are further generated in the $\phi$I1 and $\phi$I3 pulses, and only the high-speed transfer pulse is generated in the other $\phi$I2 and $\phi$I4, so that the unnecessary electric charges on the light receiving element in the image sensor 1 are swept out simultaneously with respect to the two fields. When a predetermined exposure time has elapsed, or, when proper exposure has been attained, the trigger signal rises (FIG. 6A ④), and an exposure stopping instruction is given. At this time, an H-reset pulse HR is generated in the circuit 25, and the H-resetting with respect to a horizontal synchronizing signal HSYNC is carried out. The unnecessary electric charges accumulated on the vertical transfer unit V-CCD in the solid state image sensor during the exposure time are then swept out during the period E. A SG pulse occurs (FIG. 6C ⑤) in the $\phi$I pulse immediately after the completion of this sweeping operation, and the electric charges accumulated on the light receiving element in the image sensor 1 are transferred to the accumulator therein. Accordingly, the period between ③–⑤ is an actual exposure period.

The H and V-resetting operations by a PG pulse from the recorder 3 are then carried out so that VSYNC appears 7 H after the rise of the rear edge of the PG pulse constituting the rotation reference signal for the video floppy.

When a first PG pulse after the completion of the exposure is outputted from the recorder 3, it passes through the gate 23 owing to the PG pulse, and the edge (rising part of the rear edge of) the PG pulse is detected by the edge detecting circuit 24, a H-reset signal and a V-reset signal being produced in the circuits 25, 26, respectively, on the basis of what is thus detected. The H-reset signal is applied to the frequency divider 14 and the H-shifter 18, and the V-reset signal to the V-counter 15, the V-shifter 16 and the decoder 17, and these parts are reset. Therefore, a solid state image sensor driving signal occurring in the image sensor driving apparatus 11 due to these resetting operations is synchronous with the rotation of the video floppy in the recorder 3.

The electric charges occurring due to the exposure then start being read. The signal thus read is processed in the signal processing circuit 2 and then supplied to the recorder 3. At the same time, a REC gate pulse is applied to the recorder 3. The recording is thereby done on the video floppy by the recorder 3.

The solid state image sensor driving apparatus 11 is provided with a terminal (control terminal) used to receive a predetermined voltage from the system control circuit 4 during a sweeping operation. This predetermined voltage consists of a special voltage from the system control circuit 4, and can be substituted by a trigger pulse. Also, the sweeping can be stopped automatically in accordance with an inputted trigger pulse with this predetermined voltage left as it is.

As described above, the electric charge sweeping operation (in the period A in FIG. 6) prior to the starting of the exposure can be carried out simply by merely applying a predetermined voltage to the sweeping control circuit 32. Accordingly, the operation of the microcomputer in the system control circuit 4 can be simplified, and the sweeping of the unnecessary electric charges can also be done reliably. Therefore, the quality of an image formed by the exposure does not lower.

According to this embodiment of the present invention described in detail above, the electric charge sweeping operation can be carried out before the exposure has been started, by merely applying a predetermined voltage to the sweeping control circuit. This enables the operation of the microcomputer in the system control circuit to be simplified, and the unnecessary electric charge sweeping operation to be carried out reliably. Accordingly, a solid state image sensor driving apparatus capable of reliably sweeping the unnecessary electric charges accumulated until the starting of the exposure can be obtained.

FIG. 7 shows a block diagram showing the construction of a further embodiment of the present invention. In FIG. 7, the parts similar to those in FIG. 1 are designated by the same reference numerals and detailed descriptions of said parts will be omitted.

However, the shutter control circuit 27 in FIG. 7 is a still mode shutter control circuit, in which a still picture is taken.

A continuous still mode shutter control circuit 33 adapted to produce a shutter control signal for carrying out the still mode exposure and reading alternately and continuously, and a video mode shutter control circuit adapted to control the exposure in a video mode are provided instead of the sweeping control circuit 32 in FIG. 1. The solid state image sensor driving apparatus 11 consists of a gate array.

FIG. 8A to 8J are time charts showing examples of signals from the image sensor driving circuit 11 and its peripheral parts. Referring to this time chart, FIG. 8A represents a trigger pulse supplied from the system control circuit 4 to the shutter control circuit 27, FIG. 8B one of compound pulses consisting of a $\phi I$ pulse generated in the $\phi I$ system decoder 28 and a SG pulse generated in the $\phi SG$ system decoder 29, FIG. 8C one of $\phi S$ pulses generated in the $\phi S$ system decoder 30, FIG. 8D a PG pulse supplied from the recorder 3, FIG. 8E a compound synchronizing signal CSYNC consisting of $H_{SYNC}V_{SYNC}$, FIG. 8F a composite blanking (CBLK) pulse, and FIG. 8G a PG gate pulse for passing the PG pulse through the PG gate 23. When this PG gate pulse is in a high level, only a first PG pulse generated after the completion of an exposure operation shall be effective. FIG. 8H represents a REC gate pulse showing the time at which the recording is done by the recorder 3, FIG. 8I a H-reset pulse produced in the circuit 25, and FIG. 8J a V-reset pulse produced in the circuit 26.

The operation of the embodiment will now be described with reference to FIG. 7 and time charts of FIGS. 8A-8J. The system control circuit 4 is on standby for an operation of pressing the shutter button 5. In this stage (before the shutter button 5 is operated) of operation, the V-resetting is not done even when a PG pulse appears (FIG. 8A ②). At this time, the PG gate pulse is in a high level (FIG. 8G), but an exposure operation has not yet been completed, so that the PG pulse cannot pass through the gate 23. Accordingly, neither the H-resetting nor the V-resetting is done, and $V_{SYNC}$ is not generated in a CSYNC signal.

If the shutter button 5 is pressed in this condition, a trigger signal from the system control circuit 4 falls to give an exposure starting instruction (FIG. 8A ②) to the shutter control circuit 27. At this time, a H-reset pulse HR is outputted (FIG. 8I) from the circuit 25, and the H-resetting with respect to a horizontal synchronizing signal $H_{SYNC}$ is carried out. A high-speed transfer pulse occurs immediately after the completion of the H-resetting operation in a $\phi I$ pulse (FIG. 8B) from the $\phi I$ decoder 28 to sweep out the unnecessary electric charges on the vertical transfer unit in the solid state image sensor 1. A SG pulse (FIG. 8B ③) thereafter occurs in the $\phi I$ signal to sweep out the unnecessary electric charges on the light receiving element in the solid state image sensor 1 by the high-speed transfer pulse. Then, an electric charge is accumulated on the light receiving element by the SG pulse ③'. When a predetermined exposure time has elapsed, or, when proper exposure has been attained, the trigger signal rises, and an exposure stopping instruction is given (FIG. 8A ④). At this time, a H-reset pulse HR occurs (FIG. 8I) in the circuit 25, and the H-resetting with respect to the horizontal synchronizing signal $H_{SYNC}$ is carried out. A high-speed transfer pulse is generated (FIG. 8B ⑤) in the $\phi I$ signal immediately after the completion of these resetting operations, and the electric charges occurring on the light receiving element in the solid state image sensor are swept out. Accordingly, the period between ③-⑤ is the actual exposure period. The H-resetting and V-resetting operations in accordance with a PG pulse from the recorder 3 are then done (FIG. 8D, 8I and 8J ⑥) so that a $V_{SYNC}$ appears 7 H after the rise of the rear edge of the PG pulse constituting the rotation reference signal for the video floppy.

When a first PG pulse after the completion of the exposure has been outputted (FIG. 8D ⑦) from the recorder 3, it passes through the gate 23, and the edge (rising part of the rear edge of the pulse) of the PG pulse is detected in the edge detecting circuit 24. A H-reset pulse and a V-reset pulse are produced in the circuits 25, 26, respectively, on the basis of what is thus detected. The H-reset pulse is applied to the frequency divider 14 and H-shifter 18, and the V-reset pulse to the V-counter, V-shifter 16 and decoder 17, so that these parts are reset. Therefore, a solid state image sensor driving signal generated in the driving apparatus 11 due to these resetting operations becomes synchronous with the rotation of the video floppy in the recorder 3.

At a later predetermined instant (in the case shown in FIGS. 8A to 8J, 9H after the rise of $V_{SYNC}$), the reading of the electric charges accumulated due to the exposure is started. After the signal thus read has been processed in the signal processing circuit 2, it is applied to the recorder 3. A REC gate pulse, which is risen at the same time with the fall of PG pulse and fallen 3H after the following PG pulse is applied to the recorder 3. Consequently, the signal from the signal processing ciucuit 2 is recorded on the video floppy in the recorder 3 while the REC gate pulse is in a high level "H". In a conventional apparatus of this kind, such a REC gate pulse is controlled by a microcomputer in a system control circuit 4 but, when a microcomputer having certain performance and a certain clock frequency are employed a sufficiently high accuracy cannot be obtained. In this embodiment, the REC gate pulse is therefore controlled by the shutter control circuit 27 in the driving apparatus 11. Accordingly, the accuracy of the embodiment is improved as compared with that of a conventional apparatus.

When the recording of pulses on the recorder 3 has been completed, the magnetic head of the recorder 3 is transferred to the next track to standby ready for a subsequent operation. The driving pulses (plunger driving pulse and stepping motor driving pulse) for this purpose are also generated in the solid state image sensor driving apparatus 11. These driving pulses may be outputted immediately after the REC pulse is stopped. If this control operation is carried out by the driving circuit 11, the system control circuit 4 becomes able to control the operation of the shutter during this time, so that the continuous photographing speed increases.

Since the vertical synchronizing signal $V_{SYNC}$ is generated after the completion of the exposure by carrying a V-resetting operation only after the completion of the exposure, the exposure starting and ending time do not coincide with the generation of $V_{SYNC}$ and the waiting time, which occurs in a conventional apparatus of this kind, at the exposure starting and ending time does not occur. Accordingly, the exposure can be started and ended at an arbitrary time. Therefore, there is not the possibility that a moment to take a good picture is missed. Since the waiting time is eliminated, the continuous photographing speed increases.

In the above embodiment of the present invention described in detail above, the resetting by a PG pulse is done after the completion of the exposure so as to generate a vertical synchronizing signal $V_{SYNC}$. Therefore, the starting and finishing of an exposure operation do not coincide with the generation of the signal $V_{SYNC}$ and the waiting time, which occurs in a conventional apparatus of this kind, for the exposure starting and ending operations does not occur. This enables a solid state image sensor driving apparatus capable of starting and finishing the exposure at an arbitrary time to be obtained.

FIGS. 9A-9F and 10A-10F are time charts showing examples of the signals from a further embodiment of the solid state image sensor driving apparatus 11 according to the present invention and its peripheral parts. Out of these time charts, FIGS. 9A-9F show an even (second) field, and FIGS. 10A-10F an odd (first) field which is immediately after the field of FIGS. 9A-9F.

Referring to these time charts, FIGS. 9A and 10A show a synchronizing (SYNC) signal from a decoder 17, FIGS. 9B and 10B a blanking (BLK) pulse from the decoder 17, FIGS. 9C and 10C one of $\phi I$ pulses generated in a $\phi I$ system decoder 28, FIGS. 9D and 10D one of $\phi S$ pulses generated in a $\phi S$ system decoder 29, FIGS. 9E and 10E a S blanking (SBLK) pulse from the decoder 17, and FIGS. 9F and 10F an exposure time control (SEC) pulse from a system control circuit 4.

The operation of the embodiment in a continuous still mode will now be described with reference to FIGS. 7, 9A-9F and 10A-10F.

When a continuous still mode is selected by a mode selecting switch (not shown) in the system control circuit 4, a SEC pulse of a predetermined voltage is applied from this circuit 4 to a continuous still mode shutter control circuit 33. Consequently, this shutter control circuit 33 controls the $\phi I$ system decoder 28–$\phi S$ system decoder 30 so that a timing signal for making the solid state image sensor 1 carry out exposure and reading operations alternately and continuously is generated.

At an instant ① in the second field of FIG. 9, the SEC pulse (FIG. 9F) from the continuous still mode shutter control circuit 33 falls, and an exposure starting instruction is given to the $\phi I$ system decoder 28–$\phi S$ system decoder 30. A high speed transfer pulse for sweeping the unnecessary electric charges on the vertical transfer unit is generated (FIGS. 9C and 9D ②) in the $\phi I$ pulse and $\phi S$ pulse. When this sweeping operation has been completed, high-speed transfer pulses (FIGS. 9C and 9D ③) for sweeping the unnecessary electric charges on the light receiving element occur in the $\phi I$ pulse and $\phi S$ pulse. Therefore, the exposure actually starts at the instant of generation of the last SG pulse of H-level at the rear end of FIG. 9C and 9D ③. The electric charges are thereafter accumulated due to the exposure on the light receiving element in the solid state image sensor 1.

The exposure is continuously carried out, and, at the instant in FIG. 10A ④. the second field terminates and the first field starts. The unnecessary electric charges on the vertical transfer unit are swept out (FIGS. 10C and 10D ⑥) for the preparation of the reading of electric charges. The SEC pulse rises (FIG. 10F ⑤) within the vertical blanking period to give an instruction to finish the exposure. The finishing of the exposure is set so that it is carried out within the vertical blanking period.

When the sweeping (FIGS. 10C and 10D ⑥) of the vertical transfer unit is finished, the electric charges occurring in the light receiving element in the solid state image sensor 1 due to the SG pulse are transferred (FIGS. 10C and 10D ⑦) to the storage unit thereof. The electric charges are then read out from the storage unit in the image sensor 1 at a video rate. These electric charges are converted into projected image signals in a signal processing circuit 2, and a photographed image is displayed on a monitor provided outside.

When the signal reading (FIGS. 10A-10F) described above for the first field is finished, the exposure shown in FIG. 9F is carried out repeatedly in the subsequent field. Namely, exposure and reading operations are carried out alternately in succession for 1/30 sec for each operation. The H-resetting is not done at the exposure starting and ending time so that the image on the TV monitor is not disturbed.

As described above, the exposure and reading operations are carried out alternately in succession for the two fields separately by merely applying a predetermined voltage from the system control circuit 4 to the continuous still mode shutter control circuit 33 in the solid state image sensor driving apparatus 11. Further, since the H-resetting is not done at the exposure starting and ending time unlike a case where pictures are taken in a regular still mode, a stable synchronizing signal can be obtained when an image is outputted.

Needless to say, when a still mode is selected, the still mode shutter control circuit 27 control a regular still mode photographing operation, and, when a video mode is selected, the video mode shutter control circuit 34 controls a video mode photographing operation.

In this embodiment described in detail above of the present invention, the exposure and reading operations are carried out alternately in succession for each field independently by merely applying a predetermined voltage from the system control circuit 4 to the solid state image sensor driving apparatus 11. Accordingly, a solid state image sensor driving apparatus of a simple construction capable of carrying out the exposure and reading operations continuously without carrying out a H-resetting operation can be obtained.

FIG. 11A is a block diagram showing an example of the construction of a further embodiment of the present invention. Referring to the drawing, a reference numeral 42 denotes a strobe adapted to emit light in accordance with a strobe control signal, 1 a solid state image sensor, 51 a photo sensor, which is adapted to accumulate electrical charges when it receives light, in the solid state image sensor, 52 a gate adapted to be turned on and off by a pulse supplied from the outside so as to transfer the electric charges occurring in the photo sensor to a vertical transfer unit which will be described later, 53 a a vertical transfer unit adapted to transfer the electric charges passed through the gate 52 and accumulated on the photo sensor 51, 54 a horizontal transfer unit adapted to horizontally transfer the electric charges sent from the vertical transfer unit 53 and send out the same as output signals, and 55 a sweeping drain to which the unnecessary electric charges accumulated up to the exposure starting time are swept out at the exposure starting time. A reference numeral 56 an image sensor driving circuit adapted to apply driving signals to the vertical and horizontal transfer units 53, 54 in the solid state image sensor 1, and gate 52, 57 a photometric circuit adapted to determine the exposure and send the photometric level to a system control circuit 58, which will be described later, and image sensor driving circuit 56, 58 a system control circuit adapted to control various parts, 59 a signal processing circuit adapted to process an output signal from the image sensor 1 and apply the resultant signal to a recorder therein, and 60 a recorder adapted to record a signal applied from the signal processing circuit 59 on a medium consisting of a disk.

FIG. 11B is a flow chart showing the outline of the operation of this embodiment of the present invention. The present invention is directed to a driving apparatus for a solid state image sensor provided with a photo sensor, a gate and transfer units, characterized in that the exposure is started (Step ①) in the photo sensor, a strobe being turned on (Step ②) after the lapse of a predetermined of time, the exposure being monitored (Step ③) as to whether it attains a predetermined level, the time being monitored (Step ④) as to whether a predetermined period of time has elapsed after the emission of light from the strobe, the gate being turned on when the exposure has attained a predetermined level, or, when a predetermined period of time has elapsed after the emission of light from the strobe to transfer the accumulated electric charges on the photo sensor and finish (Step ⑤) the exposure.

FIGS. 12A-12E are time charts showing the details of driving signals for driving the solid state image sensor by this embodiment of the driving apparatus according to the present invention. Referring to these time charts, trigger pulses TRIG1, TRIG2, a strobe control signal and $\phi V$ (only one thereof is shown in FIG. 12E) are produced in the image sensor driving circuit 56. Out of these pulses, the trigger pulse TRIG1 is a pulse fed from the system control circuit 58 for setting the time of exposure based on the regular light, and the trigger pulse TRIG2 a pulse obtained by shaping the waveform of an exposure control signal supplied from the photometric circuit 57 or the system control circuit 58 when the exposure by the light from the strobe has attained a proper level. The image sensor driving circuit 56 is adapted to produce a transfer pulses $\phi V$, apply these transfer pulses to the vertical transfer unit 53 and gate 52 and carry out the transferring of the electric charges from the photo sensor 51 to the vertical transfer unit 53 through the gate 52, and from the vertical tranfer unit 53 to the sweeping drain 55 or horizontal transfer unit 54. The first and second SG pulses having an amplitude up to the H-level of the transfer pulses $\phi V$ are sensor gate (SG) pulses for turning on the gate 52.

The operation of the solid state image sensor driving apparatus will now be described by using these timing charts. The gate 52 is turned on by the first SG pulse in the transfer pulse $\phi V$, and the unnecessary electric charges accumulated on the photo sensor up to this time are transferred to the vertical transfer unit 53. These electric charges are swept out to the sweeping drain 55 by the high-speed transfer pulse in $\phi V$ by the time the second SG pulse has been outputted. When the gate 52 is turned off, i.e., when the first SG pulse falls, the photo sensor 51 generates electric charges due to the receiving of the light, and continues to accumulate them thereon.

After the TRIG1 rises, a strobe operating trigger signal is generated (FIG. 12C ③), and the strobe starts emitting light. When proper exposure has attained in the midst of the emission of light from the strobe, an exposure finishing pulse occurs (FIG. 12B ④) in TRIG2. Consequently, the second SG pulse occurs (FIG. 12E ④) in $\phi V$. When proper exposure is not attained (exposure finishing pulse does not occur in TRIG2) in the midst of the emission of light from the strobe, the second SG pulse occurs (FIG. 12E ⑤) a predetermined period of time (about 300-500 microseconds) after the instant 3 .

As described above, when the second SG pulse occurs, the gate 52 is turned on, and the electric charges accumulated on the photo sensor 51 are sent to the vertical transfer unit 53. The pulses on the vertical transfer unit are then sent to the horizontal transfer unit by the $\phi V$ pulse, the resultant pulses being sent to the outside.

FIG. 13 is a block diagram of a SG pulse generating portion of the image sensor driving circuit.

Referring to the drawing, a reference numeral 61 a fall detecting circuit adapted to detect the falling of a trigger pulse 1 which substantially corresponds to the exposure time, 62 a circuit adapted to generate a first SG pulse after the occurrence of the falling of the pulse detected by the fall detecting circuit 61, 63 a circuit adapted to detect the rise of the first SG pulse, 64 a delay circuit adapted to delay the trigger pulse 1 by a predetermined period of time after the rise, which was detected by the rise detecting circuit 63, of the same pulse 1, 65 a circuit for detecting the falling of the trigger pulse 2 which is obtained by shaping the waveform of the exposure control signal outputted from the photometric circuit 57 or the system control circuit 58 when the exposure attains a proper level, 66 a circuit for generating the second SG pulse in accordance with the falling detected by the fall detecting circuit 65 and an output from the delay circuit 64, 67 a $\phi SG$ decoder adapted to generate the first and second SG pulses on the basis of the instructions from the first and second SG pulse generating circuits 62, 66, and 68 a circuit adapted to generate a strobe control signal, by which the light is emitted from the strobe simultaneously with the rise of the trigger pulse 1 detected by the rise detecting circuit 63.

These circuits enable the first SG pulse to be generated, and the second SG pulse to be also generated in the midst of the emission of light from the strobe or a predetermined period of time after the starting of the emission of light from the strobe. Accordingly, since the exposure finishes even when proper exposure is not attained, the regulation of exposure during the use of the strobe in the present invention can be carried out reliably as compared with that under the same conditions in a conventional apparatus of this kind, the burden on the microcomputer in the system control circuit 58 becomes small.

In this embodiment described in detail above of the present invention, the gate is turned on when proper exposure is attained during the emission of light from the strobe and after the termination of the emission thereof to send the electric charges occurring on the photo sensor to the vertical transfer unit and finish the exposure. Therefore, a solid state image sensor driving apparatus of a simple construction capable of regulating the exposure accurately during the emission of light from the strobe, and having the exposure control functions by which the exposure operation can be finished reliably even when proper exposure is not attained can be obtained.

What is claimed is:

1. In a driving apparatus for solid state image sensors used for an electronic still camera for taking a still picture with a solid state image sensor, and adapted to generate timing pulses for carrying out an exposure operation of the solid state image sensor and reading electric charges occurring in a light receiving portion of the solid state image sensor due to the exposure of the film, the improvement comprising a means for generating timing pulses for carrying out the exposure and reading operations of the solid state image sensor, and a sweeping action controller adapted to make in said means for generating timing pulses when a predetermined voltage is applied from an external system control, thereto a timing pulse for sweeping the electric charges, which are accumulated in the light receiving element in the solid state image sensor, wherein the predetermined voltage is applied to the sweeping action controller before the starting of the exposure operation to carry out an operation of sweeping out the electric charges in the solid state image sensor.

2. In a driving apparatus for solid state image sensors used in an electronic still camera for taking a still picture with a solid state image sensor, and adapted to generate timing pulses for carrying out an exposure operation of the solid state image sensor and reading electric charges occurring in a light receiving portion of the solid state image sensor due to the exposure of the film, the improvement comprising a means for generating the timing pulses for carrying out the exposure and reading operations of the solid state image sensor, and a sweeping action controller for generating in said means for generating timing pulses timing pulse for sweeping out the electric charges accumulated in the light receiving portion of the solid state image sensor, wherein the sweeping of unnecessary electric charges in the light receiving element and a vertical transfer unit in the solid state image sensor is done when the exposure for a first shot during a high-speed continuous photographing operation is started, and wherein the sweeping of the unnecessary electric charges in at least one of the light receiving element and the vertical transfer unit is omitted when the exposure for second and subsequent shots is started.

3. In a driving apparatus for solid state image sensors used for an electronic still camera, and adapted to generate timing pulses for carrying out an exposure operation of a solid state image sensor and its operation of reading electric charges occurring in a light receiving element in the solid state image sensor due to the exposure of the film, the improvement by comprising a means for generating timing pulses for carrying out the exposure and electric charge reading operations of the solid state image sensor, and a controller for making in said means for generating timing pulses the timing pulses for the exposure and reading operations alternately field by field when a predetermined voltage is applied from an external system control thereto, wherein the exposure and electric charge reading operations of the solid state image sensor are carried out alternately in succession by applying the predetermined voltage to this controller.

4. In a driving apparatus for solid state image sensors adapted to generate a timing pulse and a synchronizing signal for an exposure operation of a solid state image sensor and its operation of reading an electric charge occurring due to the exposure of the film, the improvement comprising a means for generating horizontal and vertical synchronizing signals, a means for generating timing pulses for the exposure and reading operations of the solid state image sensor, and a means for resetting the synchronizing signal generating means in accordance with a reference signal applied thereto from the outside, wherein the reset means resets the synchronizing signal generating means for said vertical synchronizing signal only after the completion of the exposure operation of the solid state image sensor, and the synchronizing signal generating means generates the vertical synchronizing signal at only a predetermined time after it has been reset.

5. In a driving apparatus for solid state image sensors, adapted to take pictures with strobe light by driving a solid state image sensor having photo sensors adapted to genarate an electric charge when it receives light, a vertical transfer unit adapted to vertically transfer the electric charge generated in the photo sensor, a horizontal transfer unit adapted to horizontally transfer the electric charge from the vertical transfer unit to output the same to the outside, and a gate disposed between the photo sensor and the vertical transfer unit and capable of being switched to an ON-state or an OFF-state, the improvement comprising a means for starting an exposure after the electric charges accumulated in the photo sensor have been transferred to the vertical transfer unit, a means for giving instructions to turn on a strobe on the basis of a predetermined shutter speed after the lapse of a predetermined period of time, a first exposure ending means for turning on the gate when proper exposure has been attained in the midst of an emission of light from the strobe and transferring signal charges occurring in the photo sensor to the vertical transfer unit to finish the exposure, and a second exposure ending means for turning on the gate after the emission of light from the strobe has been completed and transferring the signal charges occurring in the photo sensor to the vertical transfer unit to finish the exposure.

* * * * *